United States Patent
Samuelsson et al.

(10) Patent No.: US 10,257,527 B2
(45) Date of Patent: Apr. 9, 2019

(54) HYBRID CODEC SCALABLE VIDEO

(71) Applicant: Telefonaktiebolaget LM Ericsson (publ), Stockholm (SE)

(72) Inventors: Jonatan Samuelsson, Stockholm (SE); Jack Enhorn, Kista (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 15/024,553

(22) PCT Filed: Sep. 12, 2014

(86) PCT No.: PCT/SE2014/051056
§ 371 (c)(1),
(2) Date: Mar. 24, 2016

(87) PCT Pub. No.: WO2015/047162
PCT Pub. Date: Apr. 2, 2015

(65) Prior Publication Data
US 2016/0234517 A1   Aug. 11, 2016

Related U.S. Application Data

(60) Provisional application No. 61/882,867, filed on Sep. 26, 2013.

(51) Int. Cl.
*H04N 19/30* (2014.01)
*H04N 19/70* (2014.01)
(Continued)

(52) U.S. Cl.
CPC .......... *H04N 19/30* (2014.11); *H04L 65/607* (2013.01); *H04N 19/12* (2014.11); *H04N 19/187* (2014.11);
(Continued)

(58) Field of Classification Search
CPC ....................................................... H04N 19/30
See application file for complete search history.

(56) References Cited

U.S. PATENT DOCUMENTS 8,774,266 B2 * 7/2014 Wang ............... H04N 21/23432
375/240.01
9,787,979 B2 * 10/2017 Boyce .................... H04N 19/70
(Continued)

FOREIGN PATENT DOCUMENTS

WO   WO 2007/080502 A2   7/2007
WO   WO 2012/105265 A1   8/2012
(Continued)

OTHER PUBLICATIONS

Communication with Supplementary European Search Report, EP Application No. EP 14847879.5, dated Jun. 17, 2016.
(Continued)

*Primary Examiner* — James M Pontius
(74) *Attorney, Agent, or Firm* — Sage Patent Group

(57) ABSTRACT

A hybrid codec scalable video bitstream comprises first encapsulation units carrying video data of a base layer and encoded according to a first video coding standard and second encapsulation units carrying video data of at least one enhancement layer and encoded according to a second video coding standard. A prefix syntax element is added to each second encapsulation unit. The prefix syntax element has a value triggering a legacy decoder to discard or ignore the second encapsulation units. A non-legacy decoder selects, based on the value of a first portion of each of the first and second encapsulation units, whether to decode the encapsulation unit according to the first video coding standard or remove the first portion from the encapsulation unit and decode the remaining portion of the encapsulation unit according to the second video coding standard.

15 Claims, 9 Drawing Sheets

(51) Int. Cl.
  H04N 19/12   (2014.01)
  H04N 19/46   (2014.01)
  H04N 19/187  (2014.01)
  H04N 19/169  (2014.01)
  H04L 29/06   (2006.01)

(52) U.S. Cl.
  CPC .......... H04N 19/188 (2014.11); H04N 19/46 (2014.11); H04N 19/70 (2014.11)

(56) References Cited

U.S. PATENT DOCUMENTS

| | | | |
|---|---|---|---|
| 2012/0106554 A1 | 5/2012 | Ng et al. | |
| 2013/0070859 A1 | 3/2013 | Lu et al. | |
| 2013/0287123 A1* | 10/2013 | Rusert | G06F 17/30516 375/240.26 |
| 2015/0304667 A1* | 10/2015 | Suehring | H04N 19/70 375/240.02 |
| 2015/0312579 A1* | 10/2015 | Sim | H04N 19/52 375/240.08 |
| 2016/0080747 A1* | 3/2016 | Choi | H04N 19/70 375/240.12 |
| 2016/0156936 A1* | 6/2016 | Suehring | H04N 19/70 375/240.26 |

FOREIGN PATENT DOCUMENTS

| WO | WO 2012/124347 A1 | 9/2012 |
|---|---|---|
| WO | WO 2014/055222 A1 | 4/2014 |

OTHER PUBLICATIONS

Boyce et al., "VPS support for out-of-band signaling and hybrid codec scalability", Document: JCTVC-K0206, Joint Collaborative Team on Video Coding (JCT-VC) of ITU-T SG 16 WP 3 and ISO/IEC JTC 1/SC 29/WG11, 11th Meeting: Shanghai, CN, Oct. 10-19, 2012, 6 pp.

Chen et al., "High efficiency video coding (HEVC) scalable extension draft 3", Document JCTVC-N1008_v3, Joint Collaborative Team on Video Coding (JCT-VC) of ITU-T SG 16 WP 3 and ISO/IEC JTC 1/SC 29/WG11, 14th Meeting: Vienna, AT, Jul. 25-Aug. 2, 2013 68 pp.

Chen et al., "Scalable High Efficiency Video Coding Test Mode 3 (SHM 3)", Document JCTVC-N1007, Joint of Team on Video Coding (JCT-VC) of ITU-T SG 16 WP 3 and ISO/IEC JTC 1/SC 29/WG11, 14th Meeting: Vienna, AT, Jul. 25-Aug. 2, 2013 9 pp.

Schierl et al., "System Layer Integration of High Efficiency Video Coding", *IEEE Transactions on Circuits and Systems for Video Technology*, vol. 22, No. 12, Dec. 2012, pp. 1871-1884.

Boyce et al. "JCTVC-N0050/JCT3V-E0037: Specification text to support AVC base layer in HEVC layered extensions" (11 pages) (Jul. 25, 2013).

Boyce et al. "Draft high efficiency video coding (HEVC) version 2, combined format range extensions (RExt), scalability (SHVC), and multi-view (MV-HEVC) extensions," Joint Collaborative Team on Video Coding (JCT-VC) of ITU-T SG 16 WP 3 and ISO/IEC JTC 1/SC 29/WG 11, 18th Meeting: Sapporo, JP (535 pages) (Jun. 30-Jul. 9, 2014).

Chen et al. "Editorial improvements on SHVC Draft Text 2," Joint Collaborative Team on Video Coding (JCT-VC) of ITU-T SG 16 WP 3 and ISO/IEC JTC 1/SC 29/WG 11, 14[h] Meeting: Vienna, AT (61 pages) (Jul. 25-Aug. 2, 2013).

ITU-T H.264 "Advanced video coding for generic audiovisual services" *Series H: Audiovisual and Multimedia Systems, Infrastructure of audiovisual services—Coding of moving video* (803 pages) (Feb. 2016).

International Search Report, Application No. PCT/SE2014/051056, dated Jan. 19, 2015.

Written Opinion of the International Searching Authority, Application No. PCT/SE2014/051056, dated Jan. 19, 2015.

Boyce, "Specification text to support AVC base layer in HEVC layered extensions", Joint Collaborative Team on Video Coding (JCT-VC) of ITU-T SG 16 WP 3 and ISO/IEC JTC 1/SC 29/WG 11, 14th Meeting (JCTVC-N0050) and 5th Meeting (JCT3V-E0037, Vienna, AT, Jul. 27-Aug. 2, 2013, 5 pages.

Samuelsson et al., "AHG15: AVC and HEVC encapsulation for hybrid codec scalability", Joint Collaborative Team on Video Coding (JCT-VC) of ITU-T SG 16 WP 3 and ISO/IEC JTC 1/SC 29/WG 11, Document JCTVC-O0190, 15th Meeting, Geneva, CH, Oct. 23-Nov. 1, 2013, 5 pp.

* cited by examiner

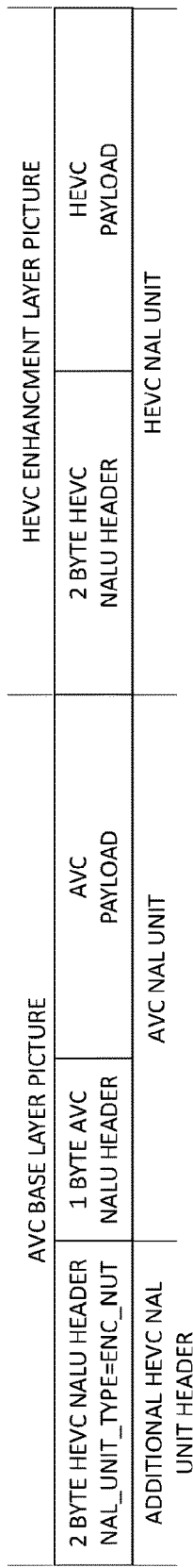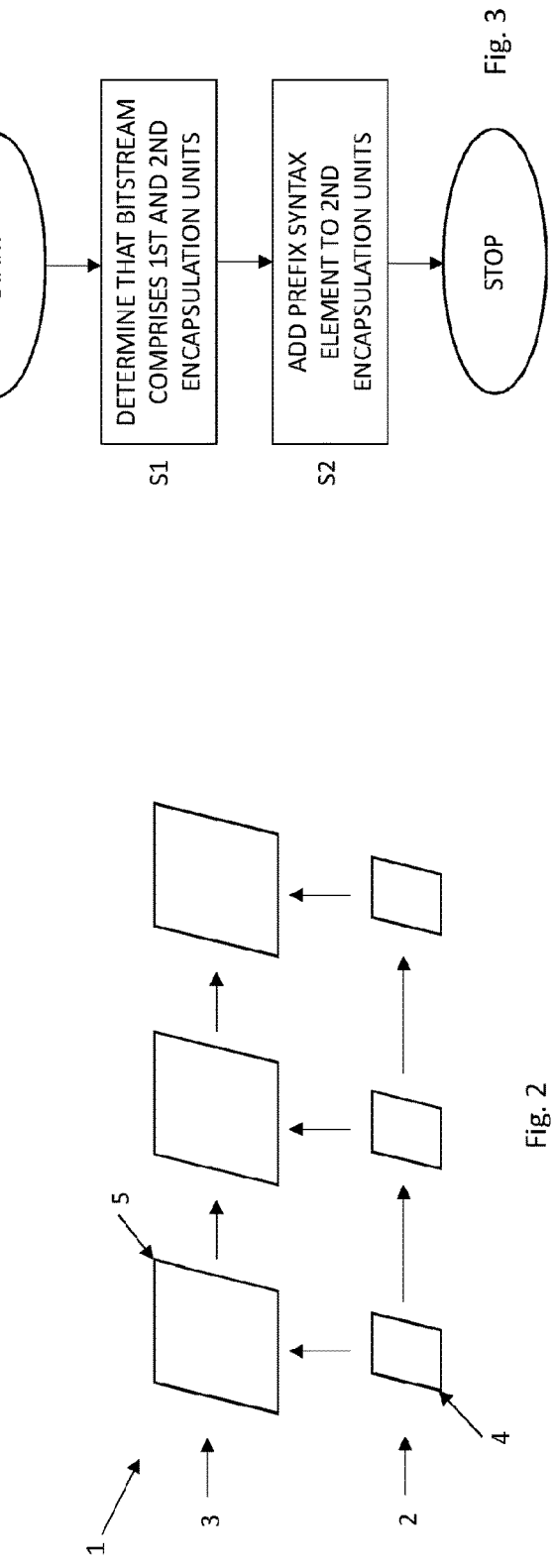

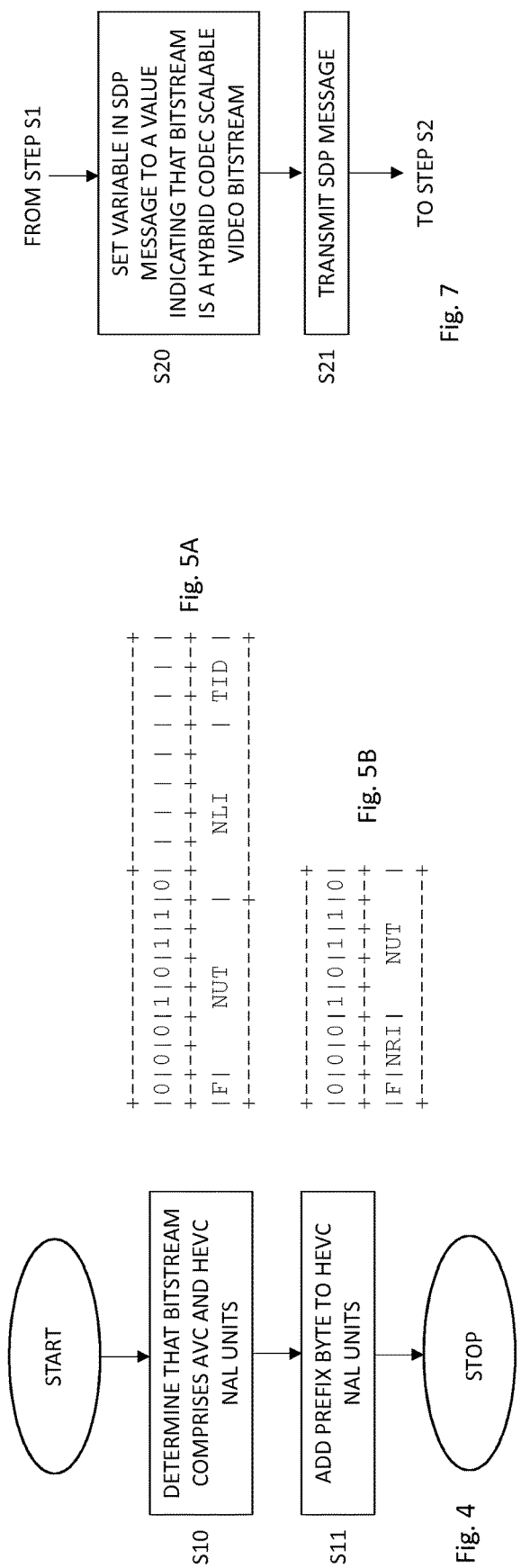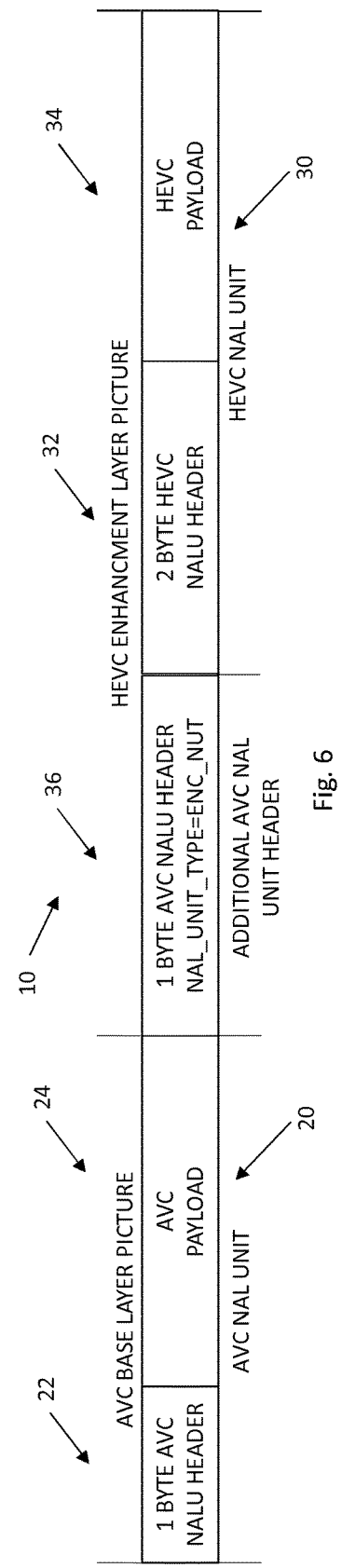

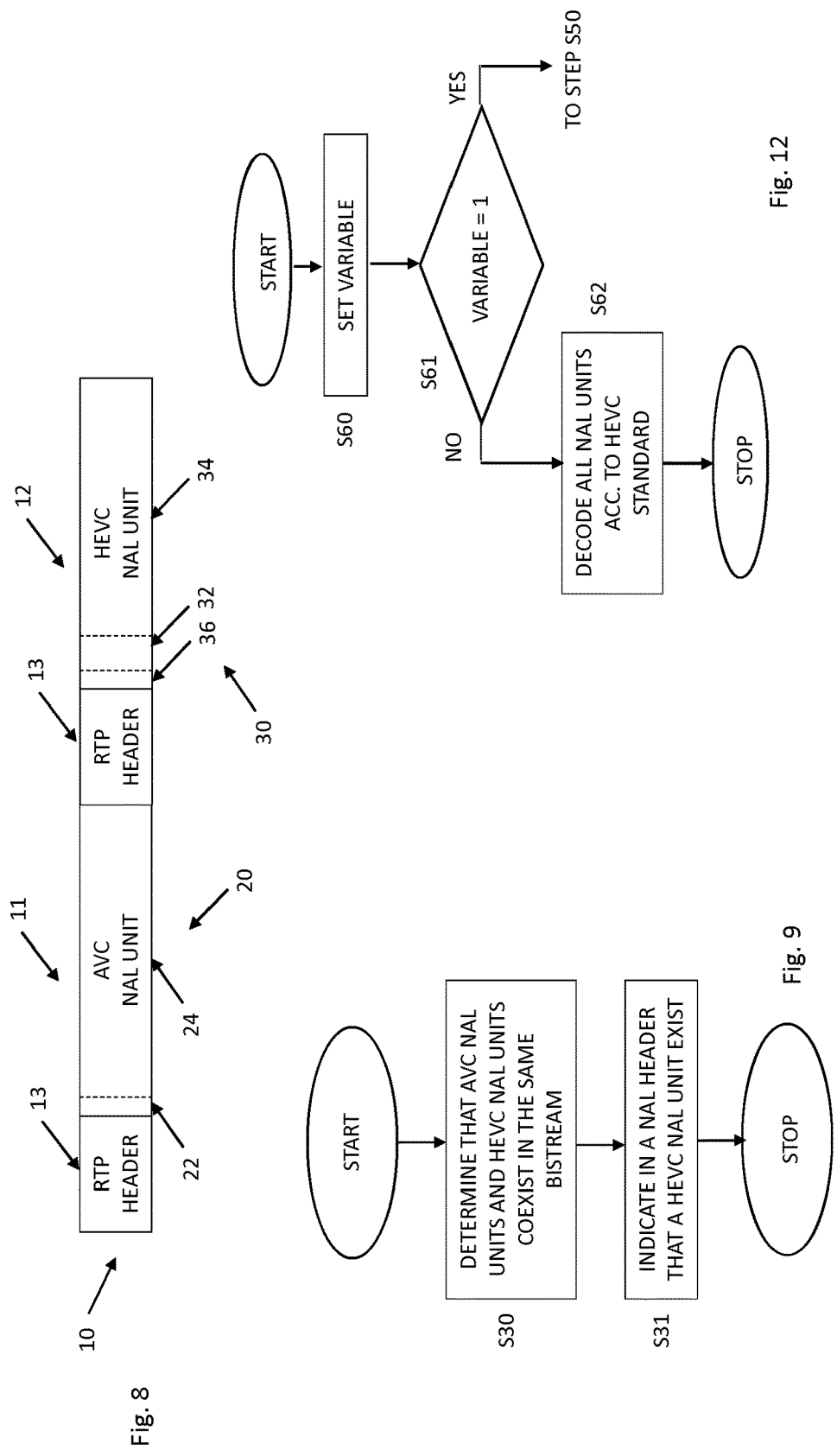

HYBRID CODEC SCALABLE VIDEO

CROSS REFERENCE TO RELATED APPLICATIONS

This application is a 35 U.S.C. § 371 national stage application of PCT International Application No. PCT/SE2014/051056, filed on Sep. 12, 2014, which itself claims the benefit of U.S. provisional Application No. 61/882,867, filed Sep. 26, 2013, the disclosure and content of both of which are incorporated by reference herein in their entireties. The above-referenced PCT International Application was published in the English language as International Publication No. WO 2015/047162 A1 on Apr. 2, 2015.

TECHNICAL FIELD

The present embodiments generally relate to hybrid codec scalable video, and in particular to hybrid codec scalable video bitstreams that are backwards compatible with legacy decoders.

BACKGROUND

Advanced Video Coding (AVC) is a widely deployed video coding standard that was developed jointly by MPEG and ITU-T and was finalized in 2003. High Efficiency Video Coding is a recent video coding standard developed in Joint Collaborative Team—Video Coding (JCT-VC), a collaborative project between MPEG and ITU-T. Version 1 of HEVC was finalized in January 2013 and currently several extensions to the standard are being developed. One of them is a scalable extension (SHVC) that allows for a single encoded bitstream to contain different versions of the same video with different resolutions and/or quality, also denoted version 2 of HEVC. Prediction between the layers is allowed in order to improve coding efficiency compared to sending the different versions of the video as independent streams. A special case of the scalable extension to HEVC is the hybrid codec scalability where the lowest layer, i.e. the base layer, is encoded with AVC and the higher layer(s), i.e. the enhancement layers, is(are) encoded with HEVC. This case is defined as the hybrid codec scalability functionality of SHVC.

Both AVC and HEVC define a Network Abstraction Layer (NAL). All the data, i.e. both video and non-video, of AVC and HEVC is encapsulated in NAL units. The NAL unit begins with a header, 1 byte in AVC and 2 bytes in HEVC, which among other things contains the NAL unit type that identifies what type of data is carried in the NAL unit. The NAL unit type is transmitted in the nal_unit_type codeword in the NAL unit header and the type indicates and defines how the NAL unit should be parsed and decoded. A bitstream consists of a series of concatenated NAL units.

The syntax for an AVC NAL unit is shown here below.

| | C | Descriptor |
|---|---|---|
| nal_unit( NumBytesInNALunit ) { | | |
|   forbidden_zero_bit | All | f(1) |
|   nal_ref_idc | All | u(2) |
|   nal_unit_type | All | u(5) |
|   NumBytesInRBSP = 0 | | |
|   for( i = nalUnitHeaderBytes; i < NumBytesInNALunit; i++ ) { | | |
|     if( i + 2 < NumBytesInNALunit && | | |
|     next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

The syntax for a HEVC NAL unit is shown here below

| | Descriptor |
|---|---|
| nal_unit( NumBytesInNalUnit ) { | |
|   nal_unit_header( ) | |
|   NumBytesInRbsp = 0 | |
|   for( i = 2; i < NumBytesInNalUnit; i++ ) | |
|     if( i + 2 < NumBytesInNalUnit && | |
|     next_bits( 24 ) = = 0x000003 ) { | |
|       rbsp_byte[ NumBytesInRbsp++ ] | b(8) |
|       rbsp_byte[ NumBytesInRbsp++ ] | b(8) |
|       i += 2 | |
|       emulation_prevention_three_byte /* equal to 0x03 */ | f(8) |
|     } else | |
|       rbsp_byte[ NumBytesInRbsp++ ] | b(8) |
| } | |

The syntax of a HEVC NAL unit header is shown here below.

| | Descriptor |
|---|---|
| nal_unit_header( ) { | |
|   forbidden_zero_bit | f(1) |
|   nal_unit_type | u(6) |
|   nuh_layer_id | u(6) |
|   nuh_temporal_id_plus1 | u(3) |
| } | |

For single layer coding, an access unit (AU) is the coded representation of a picture, which may consist of several video coding layer (VCL) NAL units as well as non-VCL NAL units. A coded video sequence (CVS) is a series of access units starting at a random access point (RAP) access unit up to, but not including, the next RAP access unit in decoding order. The decoding order is the order in which NAL units shall be decoded, which is the same as the order of the NAL units within the bitstream. The decoding order may be different from the output order, which is the order in which decoded pictures are to be output, such as for display, by the decoder.

Non-VCL NAL units are for example parameter sets. Both AVC and HEVC define picture parameter set (PPS) and sequence parameter set (SPS), which contain parameters valid for a picture or a sequence respectively. In HEVC there is another parameter set; video parameter set (VPS) that contains information valid for several layers. A new VPS can only be activated at the start of a new CVS.

The first byte of each NAL unit in AVC and HEVC contains the nal_unit_type syntax element. A decoder or bitstream parser can conclude how the NAL unit should be handled, e.g. parsed and decoded, after looking at the first byte. However if there are AVC NAL units in an HEVC stream the HEVC decoder or parser will interpret them incorrect since they will be decoded or parsed as HEVC NAL units unless some external identification method of NAL units is present. Similarly, if there are HEVC NAL units in an AVC stream the AVC decoder or parser will interpret them incorrect since they will be decoded or parsed as AVC NAL units. Hence, there is need for correctly handling hybrid codec scalable video bitstreams comprising both AVC NAL units and HEVC NAL units.

An approach [3] is to encapsulate the AVC NAL units in HEVC with an additional HEVC NAL unit header of a specific NAL unit type, e.g. nal_unit_type=ENC_NUT, where one of the HEVC nal_unit_type values that currently is reserved for future use is used for ENC_NUT. Whenever an HEVC parser sees the ENC_NUT NAL unit type, the additional HEVC NAL unit header is removed and the remaining data, including the original AVC NAL unit header, is sent to the AVC decoder.

FIG. 1 shows a bitstream with an AVC base layer picture and an enhancement layer HEVC picture. The HEVC parser will do an HEVC NAL unit type (NUT) parsing and first sees the NAL unit type ENC_NUT in the HEVC NAL unit (NALU) header of the AVC NAL unit. It will then know that the next byte and payload is the original AVC NAL unit that can be forwarded to the AVC decoder.

The main disadvantage with this approach is that legacy AVC decoders and AVC sub-bitstream extractors cannot handle the bitstream since it contains elements that are not backwards compatible. In order to extract the AVC base layer, the extractor must be instructed to process the first byte of each NAL unit according to the HEVC syntax and look for when the NAL unit type is equal to ENC_NUT. Thus, the currently proposed technology for handling hybrid codec scalable video bitstreams is not backwards compatible with existing legacy AVC decoders and sub-bitstream extractors.

SUMMARY

It is a general objective to provide an improved processing of hybrid codec scalable video.

This and other objectives are met by embodiments disclosed herein.

An aspect of the embodiments relates to an encapsulation method. The method comprises determining that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The method also comprises adding a prefix syntax element to each second encapsulation unit. The prefix syntax element has a value selected among a defined set of at least one value that will trigger a decoder conforming to the first video coding standard to discard or ignore the second encapsulation units.

Another aspect of the embodiments relates to a video decoding method. The method comprises examining a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The method also comprises decoding an encapsulation unit according to the first video coding standard if the first portion of the encapsulation unit has a value not equal to any value belonging to a defined set of at least one value. The method further comprises removing the first portion from an encapsulation unit and decoding a remaining portion of the encapsulation unit according to the second, different video coding standard if the first portion of the encapsulation unit has a value equal to a value belonging to the defined set.

A further aspect of the embodiments relates to an encapsulation device. The encapsulation device is configured to determine that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The encapsulation device is also configured to add a prefix syntax element to each second encapsulation unit. The prefix syntax element has a value selected among a defined set of at least one value that will trigger a decoder conforming to the first video coding standard to discard or ignore the second encapsulation units.

Yet another aspect of the embodiments relates to an encapsulation device. The encapsulation device comprises a determining module for determining that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The encapsulation device also comprises an adding module for adding a prefix syntax element to each second encapsulation unit. The prefix syntax element has a value selected among a defined set of at least one value that will trigger a decoder conforming to the first video coding standard to discard or ignore the second encapsulation units.

A related aspect of the embodiments defines a transmitting unit comprising an encapsulation device as defined above.

Another aspect of the embodiments relates to a video decoder. The video decoder is configured to examine a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The video decoder is also configured to decode an encapsulation unit according to the first video coding standard if the first portion of the encapsulation unit has a value not equal to any value belonging to a defined set of at least one value. The video decoder is further configured to remove the first portion from an encapsulation unit and decode a remaining portion of the encapsulation unit according to the second, different video coding standard if the first portion of the encapsulation unit has a value equal to a value belonging to the defined set.

A further aspect of the embodiments relates to a video decoder. The video decoder comprises an examining module for examining a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The video decoder also comprises a decoding module for decoding an encapsulation unit according to the first video coding standard if the first portion of the encapsulation unit has a value not equal to any value belonging to a defined set of at least one value. The video decoder further comprises a removing and decoding module for removing the first portion from an encapsulation unit and decoding a remaining portion of the encapsulation unit according to the second, different video coding standard if the first portion of the encapsulation unit has a value equal to a value belonging to the defined set.

A related aspect of the embodiments defines a receiving unit comprising a video decoder as defined above.

Yet another aspect of the embodiments relates to a computer program comprising instructions, which when executed by a processor, cause the processor to determine that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The processor is also caused to add a prefix syntax element to each second encapsulation unit. The prefix syntax element has a value selected among a defined set of at least one value that will trigger a decoder conforming to the first video coding standard to discard or ignore the second encapsulation units.

A further aspect of the embodiments relates to a computer program comprising instructions, which when executed by a processor, cause the processor to examine a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The processor is also caused to decode an encapsulation unit according to the first video coding standard if the first portion of the encapsulation unit has a value not equal to any value belonging to a defined set of at least one value. The processor is further caused to remove the first portion from an encapsulation unit and decode a remaining portion of the encapsulation unit according to the second, different video coding standard if the first portion of the encapsulation unit has a value equal to a value belonging to the defined set.

A related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments generate a hybrid codec scalable video bitstream that can be correctly handled by both legacy decoders capable of encoding base-layer-carrying encapsulation units and decoders that can decode both base-layer-carrying encapsulation units and enhancement-layer-carrying encapsulation units even if these encapsulation units are encoded using different video coding standards.

BRIEF DESCRIPTION OF THE DRAWINGS

The embodiments, together with further objects and advantages thereof, may best be understood by making reference to the following description taken together with the accompanying drawings, in which:

FIG. 1 illustrates a bitstream with AVC NAL units and HEVC NAL units;

FIG. 2 illustrates a hybrid codec scalable video with a base layer and one enhancement layer;

FIG. 3 is a flow chart illustrating an encapsulation method according to an embodiment;

FIG. 4 is a flow chart illustrating an encapsulation method according to another embodiment;

FIG. 5A illustrates a HEVC NAL unit header with nal_unit_type=11 and nuh_layer_id<32;

FIG. 5B illustrates an AVC NAL unit header with nal_ref_idc=0 and nal_unit_type=22;

FIG. 6 illustrates a bitstream with AVC NAL units and HEVC NAL units according to an embodiment;

FIG. 7 is a flow chart illustrating additional, optional steps of the method shown in FIG. 3;

FIG. 8 illustrates a bitstream with AVC NAL units and HEVC NAL units packed in RTP packets according to an embodiment;

FIG. 9 is a flow chart illustrating an encapsulation method according to a further embodiment;

FIG. 12 is a flow chart illustrating additional, optional steps of the method shown in FIG. 11;

DETAILED DESCRIPTION

Figure 11:
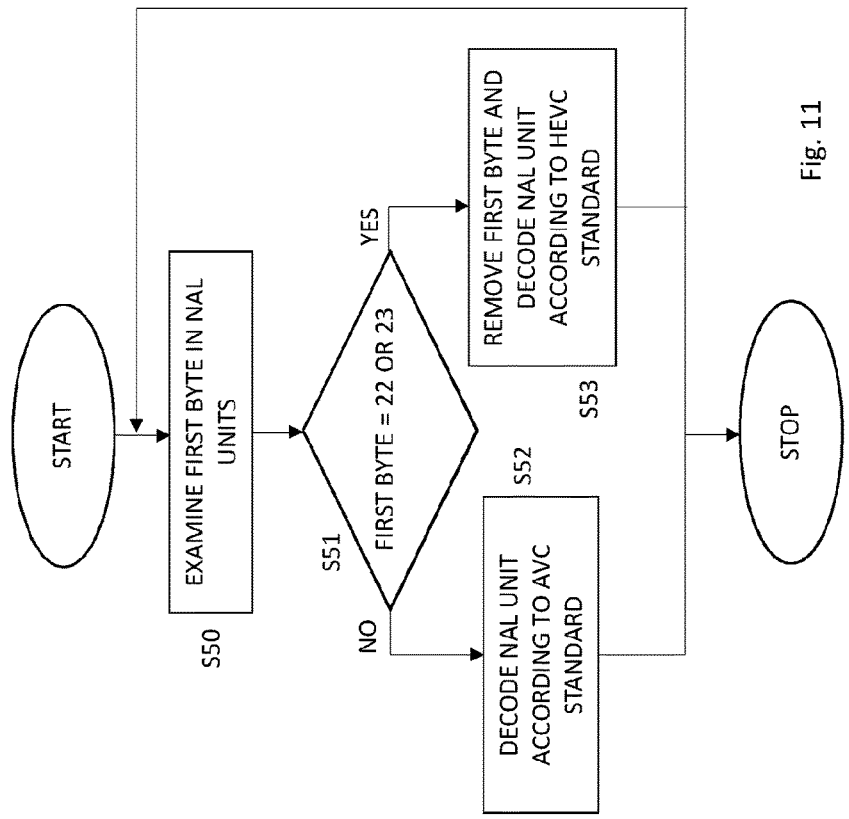
FIG. 11 is a flow chart illustrating a video decoding method according to another embodiment.

Throughout the drawings, the same reference numbers are used for similar or corresponding elements.

The present embodiments generally relate to hybrid codec scalable video, and in particular to hybrid codec scalable video bitstreams that are backwards compatible with legacy decoders.

A hybrid codec scalable video bitstream is generated by encoding hybrid codec scalable video or video sequence 1 as shown in FIG. 2. The video sequence 1 comprises a number of pictures 4, 5 organized in different layers 2, 3. Generally, a lowest layer 2, denoted base layer 2 within the technical field, comprises pictures 4 that are encoded and decoded without reference to pictures 5 in other layers 3 of the video sequence 1. However, the pictures 4 in the base layer 2 may be encoded and decoded using reference pictures present within the base layer 2. A higher layer 3, denoted enhancement layer 3 within the technical field, comprises pictures 5 that may be encoded and decoded using reference pictures present within the enhancement layer 3 or present within a lower layer, i.e. a lower enhancement layer or the base layer 2. The scalability achieved by providing pictures 4, 5 in different layers 2, 3 allows a single encoded bitstream to contain different versions of the same video but with different resolutions and/or different quality.

The present embodiments are directed towards a particular version or type of scalable video denoted hybrid codec scalability or hybrid codec scalable video within the technical field. Traditionally, scalable video is encoded using a scalable video encoder and decoded by a corresponding scalable video decoder operating according to a defined video coding standard, specification or format, for instance Scalable Video Coding (SVC) that is a scalable extension of H.264/AVC or a scalable extension of HEVC (SHVC). However, a hybrid codec scalable video uses different video coding standards, specifications or formats for encoding and decoding the base layer 2 as compared to the enhancement layer(s) 3. A typical example could be that the pictures 4 in the base layer are encoded according to AVC [1] and the pictures 5 in the enhancement layer(s) 3 are encoded according to HEVC [2], or more correctly version 2 of HEVC, i.e. SHVC, currently represented by specification draft [4].

Thus, a hybrid codec scalable video bitstream according to the embodiments comprises video data representing a base layer 2 of a hybrid codec scalable video 1 and where this video data is encoded according to a first video coding standard, specification or format and video data representing at least one enhancement layer 3 of the hybrid codec scalable video 1 and where this video data is encoded according to a second, different video coding standard, specification or format.

The concept of organizing pictures into different layers to achieve, for instance, scalability in spatial resolution, temporal resolution and/or quality, could also apply to so-called multi-view video. A multi-view video bitstream comprises encoded pictures representing different views, typically different camera views. In such a case, one of the views is regarded as the base view. Pictures of the base view are encoded and decoded without reference to pictures in other views. These other views may, however, contain pictures that are encoded and decoded using reference pictures present in other views than the current view. Hence, this concept maps closely to the base layer versus enhancement layer(s). A hybrid codec scalable video according to the embodiments may therefore also be in the form of multi-view video with pictures in the base view encoded according to a first video coding standard, specification or format and pictures in other views encoded according to a second, different video coding standard, specification or format. As a consequence, reference to a base layer and enhancement layer(s) as used herein also encompass a base view and other view(s) of multi-view video.

FIG. 3 is a flow chart illustrating an encapsulation method according to an embodiment. The method comprises determining, in step S1, that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. A next step S2 comprises adding a prefix syntax element to each second encapsulation unit. The prefix syntax element has a value selected among a defined set of at least one value that will trigger a decoder conforming to the first video coding standard to discard or ignore the second encapsulation units.

The video data, i.e. pixel or sample values, such as luminance and/or chrominance values, of the pixels or samples in the pictures of the hybrid codec scalable video, encoded according to the first video coding standard, i.e. video data representing the base layer 2 in FIG. 2, or encoded according to the second, different video coding standard, i.e. video data representing the enhancement layer(s) 3, are encapsulated into so-called encapsulation units.

In a typical approach, a video encoder outputs encoded video data as a series of concatenated encapsulation units that constitute the bitstream. The video encoder that encodes the pictures 4 in the base layer 2 outputs the encoded, according to the first video coding standard, video data as so-called first encapsulation units. Correspondingly, the video encoder that encodes the pictures 5 in the enhancement layer(s) 3 outputs the encoded, according to the second, different video coding standard, video data as so-called second encapsulation units. This means that the bitstream is in the form of a series of concatenated first and second encapsulation units.

Step S1 of FIG. 3 thereby determines that the encapsulation units of a bitstream carry video data encoded using different video coding standards depending on whether the video data represents a base layer or an enhancement layer. If it is determined in step S1 that the bitstream is a hybrid codec scalable video bitstream and comprises the so-called first encapsulation units and the second encapsulation units then a respective prefix syntax element is added to each second encapsulation unit in the bitstream in step S2.

The prefix syntax element is preferably added, as the name indicates, as a prefix to the second encapsulation units and consequently preferably precedes the following second encapsulation unit. In a particular embodiment, the prefix syntax element could be regarded as a header or additional header to the second encapsulation unit. In the former case, the second encapsulation units do not comprise any headers and the prefix syntax element thereby constitutes a header to the second encapsulation units. In the latter case, the second encapsulation units typically comprise a respective header with following payload data and the prefix syntax element that is added in step S2 then constitutes an additional header for the second encapsulation units.

The added prefix syntax element has a value that is selected among a defined set of one or more values. The at least one value of the set is selected so that a legacy decoder conforming to the first video coding standard will be triggered to discard or ignore the second encapsulation units. Hence, when a decoder conforming to the first video coding standard but not the second, different video coding standard receives an encapsulation unit of the bitstream it examines the first portion of the encapsulation unit. This examined first portion preferably has a length, such as in terms of number of bits, that corresponds to the length of the prefix syntax element. If this examined portion has a value belonging to the defined set the decoder is triggered to discard or ignore the encapsulation unit. This means that the decoder will not try to decode the encoded video data contained within the encapsulation unit.

The prefix syntax element can thereby be used as a means to cause decoders only conforming to the first video coding standard to discard or ignore those encapsulation units that comprise video data representing the enhancement layer(s) and encoded according to the second, different video coding standard.

Discarding a second encapsulation unit typically implies that the decoder simply removes it from the bitstream and the memory in which encapsulation units are temporarily stored prior to being decoded. Ignoring an encapsulation unit typically implies that the decoder removes and discards the contents of the encapsulation unit. The net result is therefore that the encoded video data comprised in the discarded or ignored encapsulation unit will not be decoded by the decoder.

In an embodiment, each first encapsulation unit comprises a first encapsulation unit header with an encapsulation unit type value. The first encapsulation unit also comprises a payload portion. Correspondingly, each second encapsulation unit comprises a second encapsulation unit header with an encapsulation unit type value. The second encapsulation unit also comprises a payload portion. In such a case, the defined set of at least one value preferably corresponds to at least one encapsulation unit type value that will trigger the decoder conforming to the first video coding standard to discard or ignore the second encapsulation units.

Thus, in this embodiment each encapsulation unit comprises a respective header, which among others, comprise the encapsulation unit type value. This encapsulation unit type value defines what type of data that is carried in the encapsulation unit and in particular in the following payload portion of the encapsulation unit. The defined set thereby comprises at least one value that correspond to encapsulation unit type value(s) that will trigger the decoder conforming to the first video coding standard to discard or ignore the encapsulation units having such a value as prefix syntax element.

In a particular embodiment, step S2 in FIG. 3 comprises adding, to each second encapsulation unit, the prefix syntax element having a value selected among the defined set corresponding to at least one encapsulation unit type value that is defined as reserved for future use or unspecified according to the first video coding standard.

An encapsulation unit type value that is defined, according to the first video coding standard, as reserved for future use or simply "reserved" typically implies that the value is currently not used according to the first video coding standard for representing encapsulation unit types but it may be used in future extensions of the first video coding standard. An unspecified encapsulation unit type value implies that the value will never be used by the first video coding standard to denote encapsulation unit type value. However, the unspecified value may be used by some external standard, such as transmission protocol, that defines how encapsulation units may be transported or handled within a communication network.

In another particular embodiment, step S2 comprises adding, to each second encapsulation unit, the prefix syntax element having a value selected among the defined set corresponding to at least one encapsulation unit type value that is defined as reserved for future use or unspecified according to the first video coding standard and according to the second video coding standard.

In the following, various embodiments of the encapsulation method will be further described with a particular example of hybrid codec scalable video in which video data of the base layer is encoded according to the AVC video coding standard, also referred to as the H.264/MPEG-4 Part 10 video coding standard, and video data of the enhancement layer(s) is encoded according to the HEVC video coding standard, also referred to as the H.265 video coding standard, or more correctly a scalable extension of HEVC (SHVC) or version 2 of HEVC. Encoded according to the AVC video coding standard implies generating a bitstream that can be decoded according to the AVC video coding standard [1]. Correspondingly, encoding according to the HEVC video coding standard implies generating a bitstream that can be decoded according to the HEVC video coding standard [2], or more correctly a scalable extension of HEVC or scalable enhancement layer profile of HEVC, currently represented by standard draft [4].

The embodiments are, however, not limited to this particular type of hybrid codec scalable video and can use other combinations of video coding standards than AVC and HEVC. For instance, the video data in the base layer could be encoded according to video coding standard VP8 with the video data in the enhancement layer encoded according to the video coding standard VP9, or more correctly a scalable extension of VP9. In another example, the base layer is in the form of a base view and the video data in the base view could be encoded according to AVC. In such a case, video data in the enhancement layer, represented by at least one additional view, is encoded according to HEVC, or more correctly a multiview extension or profile of HEVC.

FIG. 4 is a flow chart illustrating an encapsulation method adapted for AVC and HEVC hybrid codec scalable video. Reference is also made to FIG. 6 showing a bitstream 10 with AVC NAL units 20 and HEVC NAL units 30. The method starts in step 310, which comprises determining that the bitstream 10 comprises AVC NAL units 20 comprising video data representing the base layer and encoded according to the AVC video coding standard and HEVC NAL units 30 comprising video data representing the at least one enhancement layer and encoded according to the HEVC video coding standard. Each AVC NAL unit 20 comprises an AVC NAL unit header (NUH) 22, with a NAL unit type value, and a payload portion 24. Each HEVC NAL unit 30 correspondingly comprises a HEVC NAL unit header 32, with a NAL unit type value, and a payload portion 34. A next step S11 comprises adding, to each HEVC NAL unit 30, a prefix byte 36 having a value selected among the defined set corresponding to at least one NAL unit type value that will trigger an AVC-conforming decoder to discard or ignore the HEVC NAL units 30.

FIG. 6 clearly illustrates the bitstream 10 that is in the form of a series of AVC NAL units 20 and HEVC NAL units 30, only one of each is shown in order to simplify the figure. The AVC NAL unit 20 comprises an AVC NAL unit header 22 of 1 byte length and a following payload portion 24 comprising encoded video data of pictures in the base layer. Correspondingly, the HEVC NAL unit 30 comprises an HEVC NAL unit header 32 of 2 byte length and a following payload portion 34 comprising encoded video data of picture(s) in an enhancement layer. The HEVC NAL unit 30 also comprises an additional AVC NAL unit header 36 of 1 byte length, i.e. the prefix byte. This additional AVC NAL unit header 36 preceding the HEVC NAL unit header 32 has a value of the parameter NAL unit type (nal_unit_type) that will trigger an AVC-conforming decoder to discard or ignore the HEVC NAL unit 30.

Thus, a prefix byte 36 is added to an HEVC NAL unit 30 with an HEVC NAL unit header 32 and payload portion 34 to get a structure or unit with the prefix byte 36, the HEVC NAL unit header 32 and the payload portion 34. This resulting structure or unit is also referred to as HEVC NAL unit 30 according to an embodiment.

Generally, there are a large number of nal_unit_type values reserved for future use in the HEVC video standard [2]. One of these values of nal_unit_type is 11. An HEVC NAL unit with nal_unit_type=11 and the parameter nuh_layer_id<32 will have the same value of the first byte of the NAL unit as an AVC NAL unit with nal_ref_idc=0 and nal_unit_type=22 as shown in FIGS. 5A and 5B. Correspondingly, an HEVC NAL unit with nal_unit_type=11 and nuh_layer_id≥32 will have the same value of the first byte of the NAL unit as an AVC NAL unit with nal_ref_idc=0 and nal_unit_type=23.

FIG. 5A illustrates an HEVC NAL unit header. F indicates forbidden_zero_bit that should be $0_{bin}$ (a value of $F=1_{bin}$ is a syntax violation). NUT represents the parameter nal_unit_type. NLI represents the parameter nuh_layer_id, which is used to indicate whether additional layers may be present in the coded video sequence. In particular, nuh_layer_id specifies the highest layer identifier of the NAL units in the coded video sequence. TID represents the parameter nuh_temporal_id_plus1, which is used to specify the temporal identifier of the NAL unit.

FIG. 5B illustrates an AVC NAL unit header. F indicates forbidden_zero_bit similar to above. NRI represents the parameter nal_ref_idc, which is used to indicate whether the content of the NAL unit is to be used to reconstruct reference pictures for inter prediction. NUT represents the parameter nal_unit_type.

As is evident by comparing the first byte of the HEVC NAL unit header in FIG. 5A and the AVC NAL unit header in FIG. 5B, $NUT=001011_{bin}=11_{dec}$ in the HEVC NAL unit header and the most significant bit (MSB) of $NLI=0_{bin}$, i.e. NLI<32, and $NRI=00_{bin}=0_{dec}$ and $NUT=10110_{bin}=22_{dec}$ in the AVC NAL unit header give the same value of the first byte in both NAL unit headers, i.e. $00010110_{bin}=0x16_{hex}=22_{dec}$. Correspondingly, $NUT=001011_{bin}=11_{dec}$ in the HEVC NAL unit header and the MSB of $NLI=1_{bin}$, i.e. NLI≥32, and $NRI=00_{bin}=0_{dec}$ and $NUT=10111_{bin}=23_{dec}$ in the AVC NAL unit header give the same value of the first byte in both NAL unit headers, i.e. $00010111_{bin}=0x17_{hex}=23_{dec}$.

In a particular embodiment, the value of the prefix byte added to the HEVC NAL unit is selected to correspond to a NUT value that is defined as reserved for future use or unspecified according to the AVC video coding standard, and preferably also defined as reserved for future use or unspecified according to the HEVC video coding standard.

A value of the prefix byte corresponding to a NUT value for the AVC video coding standard implies that the prefix byte has a bit layout, in which the five least significant bits (LSBs) of the prefix byte has a value that is defined as reserved for future use or unspecified according to the AVC video coding standard. The three MSBs of the prefix byte are preferably $000_{bin}$ corresponding to $F=0_{bin}$ and $NRI=00_{bin}$ according to the AVC video coding standard.

Furthermore, a value of the prefix byte corresponding to a NUT value for the HEVC video coding standard implies that the prefix byte has a bit layout, in which the bit positions 1 to 6 (if the MSB has bit position 0 and the LSB has bit position 7 in the prefix byte) have a value that is defined as reserved for future use or unspecified according to the HEVC video coding standard. The MSB of the prefix byte is preferably $0_{bin}$ and the LSB of the prefix byte could be $0_{bin}$ or $1_{bin}$.

Hence, in a particular embodiment step S11 of FIG. 4 comprises adding, to each HEVC NAL unit, the prefix byte having a value selected among the defined set consisting of $22_{dec}$ ($0x16_{hex}=00010110_{bin}$) and $23_{dec}$ ($0x17_{hex}=00010111_{bin}$).

An AVC-conforming decoder will then, when it receives an HEVC NAL unit 30 with an added prefix byte 36, parse the first byte of the HEVC NAL unit 30 corresponding to the prefix byte 36. If this prefix byte 36 has a value of 22 or 23, the AVC-conforming decoder interprets the prefix byte 36 as an AVC NAL unit header with NUT equal to 22 or 23. These values of the NUT parameters are defined as reserved for future use in the AVC video coding standard. Hence, the AVC-conforming decoder will interpret the received HEVC NAL unit 30 in the same way as it was an AVC NAL unit with an AVC NAL unit header with a NUT value equal to 22 or 23. The AVC-conforming decoder will therefore discard or ignore the HEVC NAL unit 30.

This means that the present embodiments are backwards compatible and generate a hybrid video codec scalable video bitstream that can be correctly handled by legacy decoders conforming to the AVC video coding standard. The reason being that the prefix byte 36 added to the HEVC NAL units 30 will cause the AVC-conforming decoder to interpret the HEVC NAL unit 30, which it cannot correctly handle since it is generated according to another video coding standard (HEVC) than AVC, as an AVC NAL unit that it should discard or ignore.

The encoded video data output from the encoder, such as in the form of NAL units, may be further packaged into packets, such as for transmission over a communication network. In such a case, the protocol used for packaging and/or transmission of the encapsulation units may add respective headers to the encapsulation units in order to form the packets intended for transmission. For instance, a Real-time Transport Protocol (RTP) header may be added to the NAL units output from a video encoder to form RTP packets. Further protocol headers, such as User Data Protocol (UDP) and Internet Protocol (IP) headers could also be added to form IP/UDP/RTP packets carrying NAL units.

In an embodiment, step S1 of FIG. 3 comprises determining that the bitstream comprises first RTP packets comprising video data representing the base layer and encoded according to the first video coding standard and second RTP packets comprising video data representing the enhancement layer(s) and encoded according to the second, different video coding standard. Each first RTP packet comprises an RTP header and a first encapsulation unit and each second RTP packet comprises an RTP header and a second encapsulation unit. In this embodiment, step S2 comprises adding, to each second RTP packet, the prefix syntax element in between the RTP header and the second encapsulation unit.

FIG. 8 schematically illustrates a bitstream 10 in the form of a series of first RTP packets 11 and second RTP packets 12. Each RTP packet 11, 12 starts with an RTP header 13 followed by the first or second encapsulation unit 20, 30, represented by an AVC NAL unit 20 and an HEVC NAL unit 30 in the figure. Note that a first/second RTP packet 11, 12 could, in addition to the RTP header 13, comprise one first/second encapsulation unit 20, 30 or multiple, i.e. at least two, first/second encapsulation units 20, 30.

The prefix syntax element 36 is then added to the second RTP packets 12 in between the RTP header 13 and the second encapsulation unit 30, such as between the RTP header 13 and the HEVC NAL unit header 32 of the HEVC NAL unit 30.

This concept of adding prefix syntax elements to packets carrying encapsulation units with encoded video data representing an enhancement layer in a hybrid codec scalable video can of course be applied to other packets than RTP packets, such as UDP/RTP packets and IP/UDP/RTP packets. In such a case, the prefix syntax element is preferably added to those packets carrying the second encapsulation units and preferably in between the packet header(s) and the second encapsulation unit.

In the previously described embodiments, the addition of the prefix syntax element is typically made by the encoder encoding the hybrid codec scalable video. Thus, while the encoder generates and outputs first and second encapsulation units it adds the prefix syntax elements to the second encapsulation units as described herein. In the embodiments relating to packets comprising encapsulation units, the addition of the prefix syntax element can be made by another entity than the encoder. The another entity could then be an external means that, for instance, handles packaging of encapsulation unit for transmission over a wired or wireless communication network.

In a particular embodiment, information is provided that the bitstream is hybrid codec scalable video bitstream. FIG. 7 is a flow chart illustrating additional steps of the method shown in FIG. 3 for providing such information. The method continues from step S1 in FIG. 3 or indeed from step S2. A next step S20 comprises setting a variable in a Session Description Protocol (SDP) message to a value indicating that the bitstream is a hybrid codec scalable video bitstream. A next step S21 comprises transmitting the SDP message to a receiving RTP client. The method then continues to step S2 in FIG. 3 or ends.

SDP is a protocol for describing streaming media initialization parameters. This means that SDP is used to describe multimedia communication sessions for the purposes of session announcement, session invitation and parameter negotiation. SDP does not deliver media itself but is used for negotiation between end points or clients of media type, format, and all associated properties. The set of properties and parameters are often called a session profile.

In this embodiment, an SDP message that is sent from a transmitting RTP client towards a receiving RTP client comprises a variable, parameter or syntax element specifying that the bitstream to be transmitted from the transmitting RTP client to the receiving RTP client during the communication session is a hybrid codec scalable video bitstream.

The variable could for instance be a flag that can be set to either $0_{bin}$ or $1_{bin}$. One of these values could then indicate that the bitstream is a hybrid codec scalable video bitstram and the other value indicates that the bitstream is not a hybrid codec scalable video bitstream. Also other types of variables that can assume more than two values could be used to signal bitstream types including hybrid codec scalable video bitstream type.

In this embodiment, external means, i.e. not forming part of the bitstream itself, is used to indicate that the bitstream is a hybrid scalable video codec bitstream. In other embodiments, a variable in or associated with the bitstream could be used to indicate the bitstream is a hybrid codec scalable video bitstream. For instance, a variable in a parameter set or a parameter set extension, such as PPS, SPS or VPS or PPS extension, SPS extension or VPS extension, could be used to indicate that the bitstream is a hybrid codec scalable video bitstream. In such a case, the parameter set is preferably transmitted out of band, i.e. not in the bitstream.

FIG. 9 is a flow chart illustrating a method to be performed by an encoder for encoding a video sequence represented by a bitstream. In the method it is determined in step S30 that AVC NAL units and HEVC ANL units have to coexist in the same bitstream. A next step S31 comprises indicating in a NAL header that an HEVC NAL unit exist. The indication may be performed according to one of the embodiments described herein or a combination thereof.

Generally, when a decoder receives a bitstream comprising encapsulation units according to the embodiments the decoder examines a first portion of each encapsulation unit in the bitstream. If the decoder is a legacy decoder conforming with a first video coding standard but not a second, different video coding standard the decoder discards or ignores the encapsulation unit if the first portion has a value selected among the defined set of at least one value. Hence, in this case the encapsulation unit is a second encapsulation unit carrying video data representing an enhancement layer and encoded according to the second video coding standard that the decoder cannot handle. If the first portion, however, has a value different from the defined set the legacy decoder decodes the encapsulation unit according to the first video coding standard. Hence, in this case the encapsulation unit is a first encapsulation unit carrying video data representing a base layer and encoded according to the first video coding standard that the legacy decoder can handle.

This means that the hybrid codec scalable video bitstream is backwards compatible and can be handled also by legacy decoders that operate according to the first but not the second video coding standard. Such backwards compatibility is not possible according to the prior art solution presented in document [3].

Figure 10:
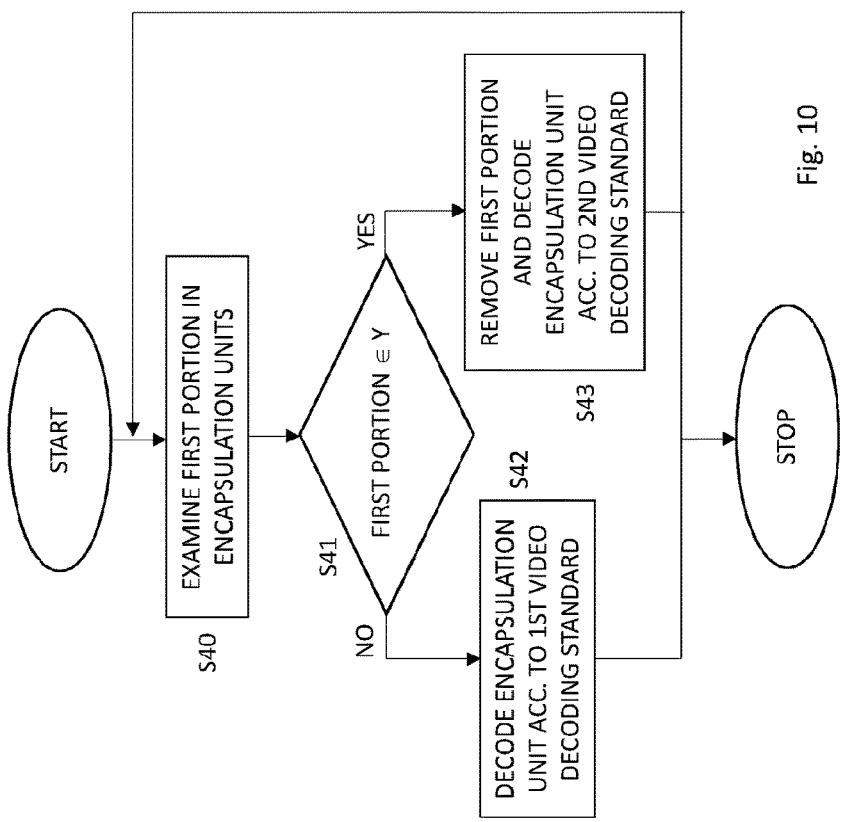
FIG. 10 is a flow chart illustrating a video decoding method according to an embodiment.

FIG. 10 is flow chart illustrating a video decoding method according to an embodiment, and in particular such a video decoding method that is performed by a decoder that supports hybrid codec scalable video.

The method starts in step S40, which comprises examining a first portion of each encapsulation unit in a bitstream comprising first encapsulation units and second encapsulation units. The first encapsulation units comprise video data representing a base layer of a hybrid codec scalable video and encoded according to a first video coding standard. The second encapsulation units comprise video data representing at least one enhancement layer of the hybrid codec scalable video and encoded according to a second, different video coding standard. Step S42 comprises decoding an encapsulation unit according to the first video coding standard if the first portion of the encapsulation unit has a value not equal to any value belonging to a defined set of at least one value. Correspondingly, step S43 comprises removing the first portion from an encapsulation unit and decoding a remaining portion of the encapsulation unit according to the second, different video coding standard if the first portion of the encapsulation unit has a value equal to a value belonging to the defined set.

The examination as performed in step S40 preferably corresponds to parsing the first portion of the encapsulation unit in order to determine the value represented by this first portion. The length of this first portion, such as in terms of number of bits or bytes, preferably corresponds to, i.e. is equal to, the length of the previously mentioned prefix syntax element. This value is then compared, in an optional step S41, to the value(s) of the defined set. In FIG. 10 this defined set is represented by Y. Hence, step S41 could be regarded as determining whether the value represented by the first portion belongs to the defined set ($\in$Y). If the first portion has a value equal to a value belonging to the defined set the encapsulation unit is a so-called second encapsulation unit. The first portion is thereby removed from the encapsulation unit to form a remaining portion, typically comprising a second encapsulation unit header and payload portion, that is decoded according to the second video coding standard in step S43. However, if the value represented by the first portion is not equal to any value belonging to the defined set, i.e. does not belong to the defined set, the encapsulation unit is a so-called first encapsulation unit. The encapsulation unit is then decoded in step S42 according to the first video coding standard.

FIG. 11 is flow chart illustrating a particular embodiment of the video decoding method. The method starts in step S50 where a first byte of each NAL unit in the bitstream is examined. In this embodiment, the bitstream comprises AVC NAL units comprising video data representing the base layer and encoded according to the AVC video coding standard and HEVC NAL units comprising video data representing the at least one enhancement layer and encoded according to the HEVC video coding standard.

If the first byte of a NAL unit has a value not equal to any value belonging to the defined set the method continues to step S42. This step S42 comprises decoding the NAL unit according to the AVC video coding standard. If the first byte of a NAL unit has a value equal to a value belonging to the defined set the method instead continues to step S42. Step S43 comprises removing the first byte from the NAL unit and decoding a remaining portion of the NAL unit according to the HEVC video coding standard.

The first byte of each NAL unit is examined, such as parsed or parsed and decoded, in step S50 in order to determine the value that is represented by this first byte of the NAL unit. The determined value is optionally compared to the at least one value within the defined set in step S51. If the determined value is equal to one of the at least one value in the defined set the NAL unit is an HEVC NAL unit with an added prefix byte. The prefix byte is then removed in step S53 and the remaining portion corresponding to the HEVC NAL unit header and the payload portion is decoded according to the HEVC video coding standard.

If the determined value does not belong to the defined set, i.e. is not equal to any of the at least one value of the defined set, the method instead continues to step S52. In this case the NAL unit is an AVC NAL unit without any added prefix byte. The AVC NAL unit comprising an AVC NAL unit header and payload portion is decoded according to the AVC video coding standard.

In an embodiment, the defined set consists of the value $22_{dec}$ ($0x16_{hex}$=$00010110_{bin}$). In another embodiment, the defined set consists of the value $23_{dec}$ ($0x17_{hex}$=$00010111_{bin}$). In a further embodiment, the defined set consists of the values $22_{dec}$ and $23_{dec}$ as shown in FIG. 11.

In the latter embodiment, step S52 preferably comprises decoding the NAL unit according to the AVC video coding standard if the first byte of the NAL unit has a value different from the defined set consisting of 22 and 23. Step S53 then comprises removing the first byte from the NAL unit and decoding the remaining portion of the NAL unit according to the HEVC video coding standard if the first byte of the NAL unit has a value equal to 22 or 23.

FIG. 12 is a flow chart illustrating additional, optional steps of the video decoding method shown in FIG. 11. In a first step S60, a variable associated with the bitstream is set to a value based on input information. In such a case, decoding of the NAL unit and removing the first portion is performed if the variable has a value indicating that the bitstream is a hybrid codec scalable video bitstream. However, if the variable does not have the value indicating that the bitstream is a hybrid coded scalable video bitstream then the method continues to step S62, which comprises decoding all NAL units according to the HEVC video coding standard.

This means that the value of the variable set in step S60 is used to determine whether the bitstream is a hybrid codec scalable video bitstream or a traditional scalable video bitstream or bitstream in which all NAL units are encoded using the same video encoding standard.

The variable could be in the form of a flag assuming either the value of $0_{bin}$ or $1_{bin}$. In FIG. 12 it is assumed that a value of the variable equal to $1_{bin}$ indicates that the bitstream is a hybrid codec scalable video bitstream, i.e. comprises both AVC and HEVC NAL units, whereas a value of $0_{bin}$ indicates that all NAL units are HEVC NAL units. In another embodiment, a variable value of $0_{bin}$ indicates a hybrid codec scalable video bitstream.

In the optional comparison in step S61, the method continues to step S50 in FIG. 11 if the variable is set to $1_{bin}$, i.e. is a hybrid codec scalable video bitstream. If the variable instead has a value of $0_{bin}$ all NAL units can be decoded according to the HEVC video coding standard in step S62.

In another embodiment, the variable is the codec identifier itself, such as the Multipurpose Internet Mail Extensions (MIME) type used in SDP. In this case, the codec would use a MIME type, such as SHVC-hybrid rather than just SHVC. This means that the codec identifier could be used as variable to determine whether the bitstream is a hybrid codec scalable video bitstream (SHVC-hybrid MIME type) or a traditional scalable video bitstream (SHVC MIME type).

The variable is preferably set in step S60 by the decoder to a value based on input information. This input information could be provided by external means, i.e. not specified in the video coding standard. For instance, the input information could be defined in a system specification, i.e. represent system level information, e.g. in a file format header, packer header or SDP message. Alternatively, an Application Programming Interface (API) could be used to provide the input information, for instance from a user.

Figure 13:
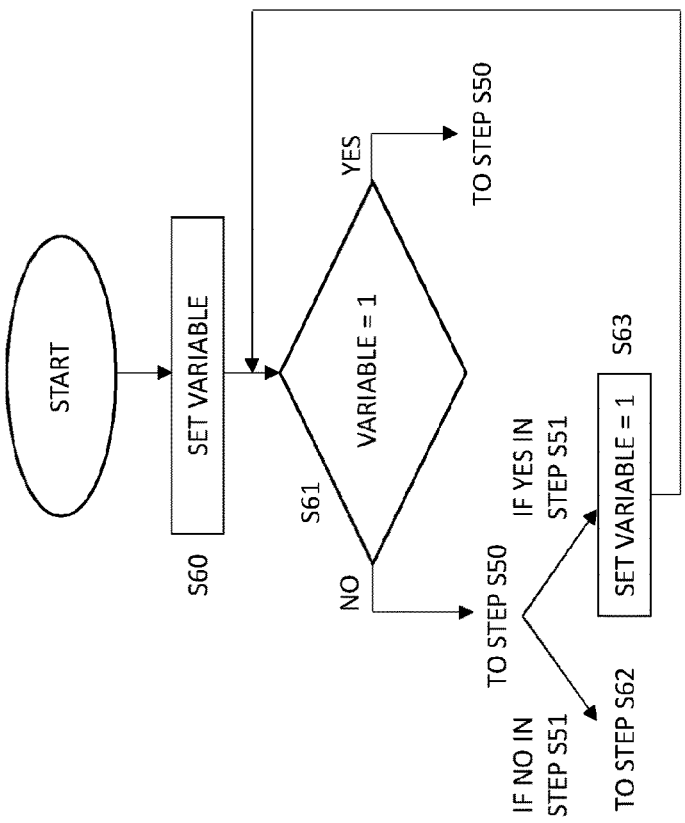
FIG. 13 is a flow chart illustrating additional, optional steps of the method shown in FIG. 12.

FIG. 13 is a flow chart illustrating a variant of the method steps shown in FIG. 12. In this case steps S60 and S61 are performed as described above. However, if the variable is determined to be equal to $0_{bin}$, i.e. indicates that the bitstream is not a hybrid codec scalable video bitstream, the method continues to step S50 in FIG. 11. This step S50 examines the first byte in the NAL units. If the first byte has a value not equal to any value in the defined set, such as different from 22 and 23, the method continues to step S62 in FIG. 12, where all NAL units are decoded according to the HEVC video coding standard. However, if it is determined in step S51 that a NAL unit has a value of its first byte equal to a value belonging to the defined set, e.g. equal to 22 or 23, the method continues to step S63. This step S63 comprises setting the variable to $1_{bin}$. The method then continues to step S61.

Hence, in a particular embodiment the video decoding method comprises setting, if the variable is equal to 0, the variable to 1 if a first byte of a NAL unit has a value equal to a value belonging to the defined set.

The flow chart of FIG. 13 provides a solution for the decoder to handle the case where the variable is set to indicate that the bitstream is not a hybrid codec scalable video stream but where at least one of the NAL units has a prefix byte with a value belonging to the defined set. The value of the variable set in step S60 is thereby overrridden in step S63 causing the bitstream to be processed as a hybrid codec scalable video bitstream.

Figure 14:
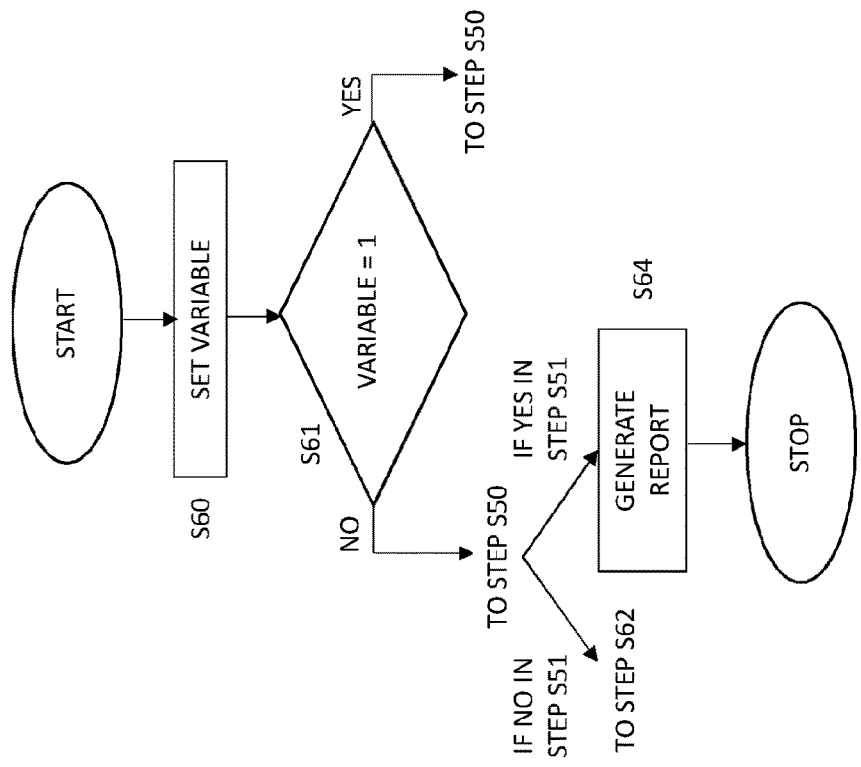
FIG. 14 is a flow chart illustrating additional, optional steps of the method shown in FIG. 12.

FIG. 14 is a flow chart illustrating another approach of handling such an error other than overriding the variable value. Step S60 comprises setting a variable in or associated with the bitstream to a value based on input information as previously described herein. In this approach, step S64 comprises generating, if the variable is equal to 0, a report that the bitstream cannot be decoded if a first byte of a NAL unit has a value equal to a value belonging to the defined set.

Thus, a variable value equal to 0 as determined in step S61 should indicate that all NAL units are HEVC NAL units without any prefix byte. The first byte of these NAL HEVC units should therefore not have a value belonging to the defined set. However, if a NAL unit is indeed detected to have a first byte with a value belonging to the defined set the report is generated in step S64 to indicate that the bitstream cannot be decoded.

In a further approach, the variable in or associated with the bitstream is set to a value based on input information in step S60 in FIG. 14. In this approach, step S64 comprises generating, if the variable is equal to 0, a report that the bitstream contains errors if a first byte of a NAL unit has a value equal to a value belonging to the defined set.

This approach is similar to above but with the difference that the report now indicates that the bitstream contains an error rather than indicating that the bitstream cannot be decoded.

Figure 15:
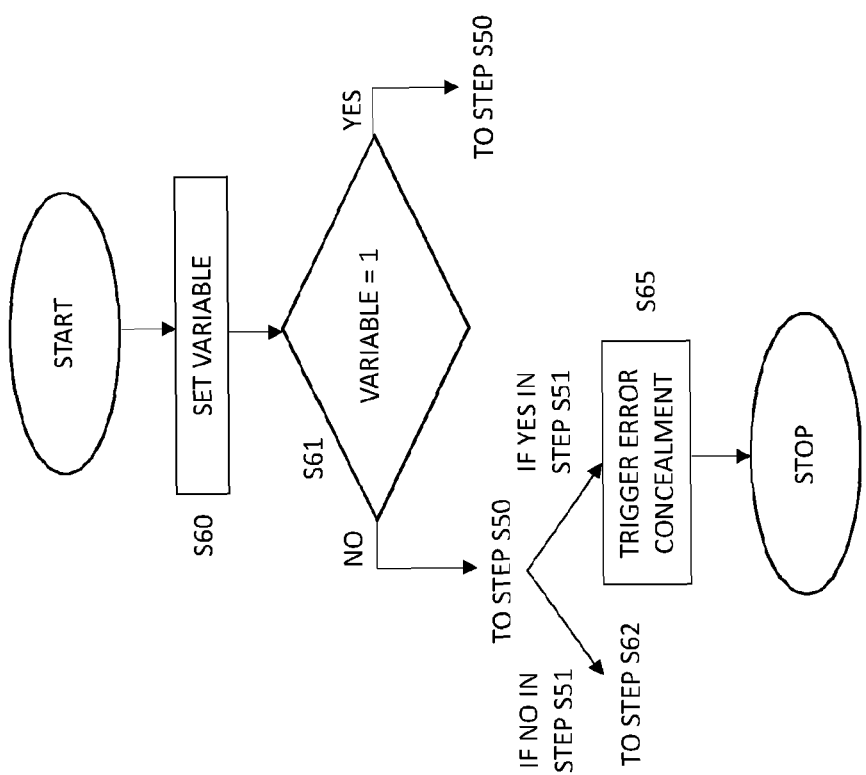
FIG. 15 is a flow chart illustrating additional, optional steps of the method shown in FIG. 12.

FIG. 15 is a flow chart illustrating yet another approach of handling an error. The method comprises setting a variable in or associated with the bitstream to a value based on input information in step S60. Step S65 of FIG. 15 comprises triggering, if the variable is equal to 0, an error concealment method if a first byte of a NAL unit has a value equal to a value belonging to the defined set. An example of such an error concealment method that can be applied if a NAL unit is indeed detected to have a first byte with a value belonging to the defined set is to try to decode the NAL unit with the assumption that a bit error has occurred in the first byte. Within such a method it could be tested which other NAL unit types that can be indicated by changing the value of a single bit in the first byte of the NAL unit header. The method would then consist of trying to decode the NAL unit according to one or more of these possible other NAL unit types.

The variable in or associated with the bitstream and set based on input information in step S60 of FIGS. 12-15 could, for instance, be a variable present in a parameter set or parameter set extension as previously mentioned herein.

In the variants described above in connection with FIGS. 12-15 step S60 comprises setting, at the receiving or decoding side, the variable based on input information. In an alternative approach, the variable is set at the transmitting or encoding side. In such a case, step S60 of FIGS. 12-15 comprising examining a value of a variable in or associated with the bitstream.

Figure 16:
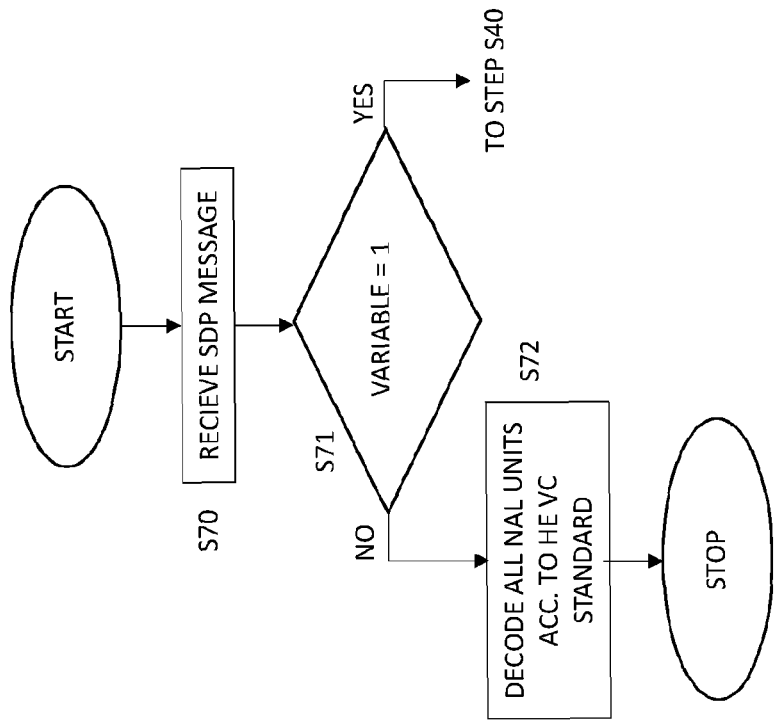
FIG. 16 is a flow chart illustrating additional, optional steps of the method shown in FIG. 10.

FIG. 16 is a flow chart illustrating additional, optional steps of the method shown in FIG. 10. In this case, the bitstream comprises RTP packets comprising an RTP header and an encapsulation unit. The method starts in step S70, which comprises receiving an SDP message from a transmitting RTP client. A variable in the SDP message is examined in step S71. The method also comprises determining, in step S71, that the bitstream is a hybrid codec scalable video bitstream based on the variable.

In this embodiment, the value of the variable present in the SDP message is examined to determine whether the bitstream is a hybrid codec scalable video bitstream, such as represented by a variable value equal to $1_{bin}$. The method should then continue to step S40 of FIG. 10. However, if the variable indicates that the bitstream is not a hybrid codec scalable video bitstream, such as a variable value=$0_{bin}$, the method preferably continues to step S72, where all encapsulation units, such as NAL units, are decoded according to the second video coding standard, such as HEVC video coding standard.

An example of variable present in the SDP message is the previously mentioned MIME type used to signal codec identifier.

Figure 17:
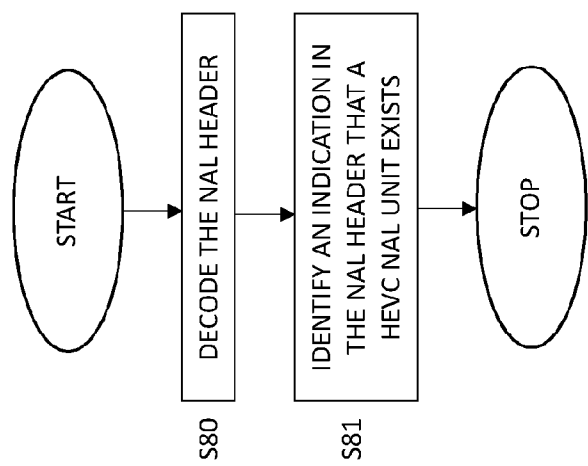
FIG. 17 is a flow chart illustrating a video decoding method according to a further embodiment.

In an embodiment as shown in FIG. 17, a method to be performed by a decoder for decoding a video sequence represented by a bitstream comprises decoding the NAL header in step S80. A next step S81 comprises identifying an indication in the NAL header that an HEVC NAL unit exists. The indication may be according to any of the disclosed embodiments or a combination thereof.

As mentioned in the foregoing, scalable video coding where one (legacy) video coding standard (codec) is used for the base layer and another video codec is used for the enhancement layer is called hybrid scalability. In general, a codec defines how encoded data is represented as a string of bits, denoted bitstream or elementary stream. When data from two different codecs are mixed into the same bitstream due to hybrid codec scalability it is important to be able to identify which data should be handled according to which standard, i.e. a bitstream format that allows for codec identification is needed.

The embodiments relate to an encapsulation method such that AVC NAL units and HEVC NAL units can coexist in the same bitstream in a manner that makes it possible for legacy AVC decoder to identify the AVC NAL units and for an SHVC decoder to identify both HEVC and AVC NAL units. More specifically, an embodiment consists of encapsulating HEVC NAL units in AVC bitstreams by using an AVC NAL unit type that functions as a prefix to the HEVC NAL unit header of HEVC NAL units.

FIG. 6 shows an example which the AVC decoder will see. The first NAL unit header 22 is a legacy header so the decoder will just decode the first picture as-is. The second NAL unit header 36 has a reserved type (ENC_NUT) which means that all legacy AVC decoders will discard the entire NAL unit 30; this includes the AVC header 36, the HEVC header 32 and the HEVC payload 34.

Embodiments relate to encapsulating HEVC NAL units in AVC NAL units such that an SHVC decoder (that supports the hybrid-codec-scalability) would use the AVC NUT specified for encapsulating HEVC NAL units in order to find the NAL units that should be parsed (and decoded) with HEVC syntax and such the AVC decoders can decide whether the NAL unit should be discarded.

In all of the embodiments below the bitstream format for the hybrid codec scalability of AVC and HEVC is defined such that AVC NAL units exist (unmodified) in the bitstream but HEVC NAL units have an additional syntax element preceding the HEVC NAL unit header.

In all of the embodiments below a single value, hereafter referred to as "X", is used for indication and identification of an HEVC NAL unit. It is further assumed that the value X is represented by a single byte (8 bits), hereafter referred to as "the prefix byte". However, the embodiments also apply, to the case where multiple values are defined to indicate and identify HEVC NAL units. The set of all those values is hereafter referred to as "Y". One reason for having multiple values could be to differentiate different types of NAL units, for example VCL NAL units vs. non-VCL NAL units or VPS NAL units vs. all other NAL units. Any occurrence of terms like "the first byte is equal to X" can thus be replaced by "the first byte is equal to any of the values in Y". The embodiments also apply to when a different number of bits is used for the indication and identification. 7 bits would be enough to differentiate NAL unit types between AVC and HEVC. 16 bits could be used if additional information is desired to be bundled with the indication. Any occurrence of terms like "the first byte is equal to X" can thus be replaced by "the first N bits is equal to X" where N is a natural number.

The preferred realization in all of the embodiments below is to select a value of X that corresponds to a value of nal_unit_type in AVC which has previously been defined as "reserved for future use by ITU-T|ISO/IEC" as this would work best with legacy systems and decoder. However, the embodiment could also apply to other values of X such as a value that corresponds to an AVC nal_unit_type that has previously been defined as "Unspecified" or a nal_unit_type that for some reason will not otherwise be present in the bitstream, for example a nal_unit_type that is forbidden to be present in the base layer by the SHVC specification. The only thing that is important is that the NAL unit can be unambiguously identified as an HEVC NAL unit.

Two examples of values for X are 22 and 23, which expressed in hexadecimal form are 0x16 and 0x17, respectively. Both of these corresponds to nal_unit_type equal to 11 (0xB) in HEVC, which is reserved for future use. In AVC these values correspond to nal_unit_types 22 and 23, which both are defined as reserved for future use. In some examples (syntax tables below) the value 0x17 is used to exemplify how X is used.

Further, it should be noted that SHVC is an extension of HEVC, which implies that SHVC is a type of HEVC.

Embodiment 1

An SHVC encoder that supports the hybrid codec scalability profile may use the embodiment according to the following ordered steps to encode a bitstream that conforms to the hybrid codec scalability profile:
1. The input video is encoded as a scalable video stream in which:
  Pictures and data that belong to the lowest layer are encoded using the encoding process defined in the AVC specification with AVC NAL unit headers, or more correctly encoded according to the syntax and semantics defined in the AVC specification with the AVC NAL unit headers.
  Pictures and data that belong to higher layers are encoded using the encoding process specified in the SHVC specification with the addition of the prefix byte in front of each HEVC NAL unit header, or more correctly encoded according to the syntax and semantics defined in the SHVC specification with the addition of the prefix byte.

A legacy AVC decoder may perform the following steps to decode the bitstream:
1. NAL units in which the value of the first byte is equal to X are ignored (removed from the bitstream and discarded).
2. Other NAL units are processed (parsed and decoded) according to the AVC specification.

A legacy AVC bitstream extractor may use the embodiment according to the following ordered steps:

1. NAL units in which the value of the first byte is equal to X are ignored (removed from the bitstream and discarded).
2. Other NAL units are forwarded (to an AVC decoder).

Thus no new functionality is required by the legacy AVC decoder.

However, an SHVC decoder that supports the hybrid codec scalability profile may perform the following to decode a bitstream that conforms to the hybrid codec scalability profile according to the embodiment:
1. The first byte of each NAL unit is examined and the SHVC decoder is configured to interpret that as:
  If the value of the first byte is not equal to X then the NAL unit is decoded using the decoding process defined in the AVC specification and, when the decoding process results in a decoded picture, that decoded picture might be further processed as defined in the SHVC specification.
  Otherwise (the value of the first byte of the NAL is equal to X), the NAL unit is decoded using the decoding process specified in the SHVC specification.

Embodiment 2

In one embodiment a decoder is provided via external means with the information of whether the stream is a hybrid codec scalability stream with AVC base layer or if it is a regular SHVC stream, i.e. without AVC NAL units and without the prefix byte in HEVC NAL units. What the external means is, is not specified in the standard, but can be a number of different ways to provide the information of whether the stream is a hybrid codec scalability stream with AVC base layer or if it is a regular SHVC stream. Examples of external means are information from another standard specification, a message, a preconfiguration etc. This explanation of the external means is valid for all embodiments.

In this embodiment the encoder is configured to set the variable AvcBaseLayer in order to make it possible to have a bitstream where HEVC and AVC NAL units coexist.

"The variable AvcBaseLayer is specified as follows:
If some external means, not specified in this Specification, is available to set AvcBaseLayer, AvcBaseLayer is set by the external means.
Otherwise, AvcBaseLayer is set equal to 0."

A decoder may use the embodiment as follows:
If AvcBaseLayer is equal to 1, the first byte of each NAL unit is examined:
  If the value of the first byte is not equal to X then the NAL unit is decoded using the decoding process defined in the AVC specification and, if the decoding process results in an encoded picture; that encoded picture might be further processed as defined in the SHVC specification.
  Otherwise (the value of the first byte of the NAL unit is equal to X), the NAL unit is decoded using the decoding process specified in the SHVC specification.
Otherwise (AvcBaseLayer is equal to 0), all NAL units are decoded using HEVC syntax and the decoding process specified in the SHVC specification.

Embodiment 3

In one embodiment a decoder is provided via external means with the information of whether the prefix byte will be present for HEVC NAL units or not.

This could for example be specified as:

"The variable HevcPrefixBytePresent is specified as follows:

If some external means, not specified in this Specification, is available to set HevcPrefixBytePresent, HevcPrefixBytePresent is set by the external means.

Otherwise, HevcPrefixBytePresent is set equal to 0."

A decoder may use the embodiment as follows:

If HevcPrefixBytePresent is equal to 1 then NAL units for which the first byte is equal to X are examined until a VPS has been decoded.

If the VPS indicates that the bitstream conforms to a hybrid codec scalability profile (through a profile parameter, a flag or by other means) then the bitstream is decoded and parsed using the decoding process defined for that profile.

Otherwise (the bitstream does not conform to a hybrid codec scalability profile), the bitstream is decoded using HEVC syntax and using the decoding process specified in the SHVC specification. Otherwise (HevcPrefixBytePresent is equal to 0), all NAL units are decoded using HEVC syntax and the decoding process specified in the SHVC specification.

In a preferred version of the embodiment there is a bitstream restriction specifying that the prefix byte shall be present for all HEVC NAL units if the signaled profile is equal to a value that corresponds to a hybrid codec scalability profile. And that the prefix byte shall not be present for any HEVC NAL unit if the signaled profile is not equal to a value that corresponds to a hybrid codec scalability profile. For example:

hevc_prefix byte indicates that the current NAL unit is an HEVC NAL unit in a bitstream containing a mixture of AVC NAL units and HEVC NAL units. If profile_idc in the VPS that is active for the CVS is equal to HYBRID_CODEC, hevc_prefix_byte shall be present for each HEVC NAL unit in the CVS and the value of hevc_prefix_byte shall be equal to 0x17. Otherwise (profile_idc in the VPS that is active for the CVS is not equal to HYBRID_CODEC), hevc_prefix_byte shall not be present for any NAL unit in the CVS.

Alternatively there is a bitstream restriction specifying that the prefix byte shall be present for all HEVC NAL units if a flag that indicates hybrid codec scalability is equal to 1. And that the prefix byte shall not be present for any HEVC NAL unit if the flag that indicates hybrid codec scalability is equal to 0 For example:

hevc_prefix byte indicates that the current NAL unit is an HEVC NAL unit in a bitstream containing a mixture of AVC NAL units and HEVC NAL units. If avc_base_layer flag in the VPS that is active for the CVS is equal to 1, hevc_prefix_byte shall be present for each HEVC NAL unit in the CVS and the value of hevc_prefix_byte shall be equal to 0x17. Otherwise (avc_base_layer flag in the VPS that is active for the CVS is equal to 0), hevc_prefix_byte shall not be present for any NAL unit in the CVS.

A decoder may use the embodiment as follows:

If HevcPrefixBytePresent is equal to 1, the first byte of each NAL unit is examined:

If the value of the first byte is not equal to X then the NAL unit is decoded using the decoding process defined in the AVC specification and, if the decoding process results in a decoded picture; that decoded picture might be further processed as defined in the SHVC specification.

Otherwise (the value of the first byte of the NAL unit is equal to X), the NAL unit is decoded using the decoding process specified in the SHVC specification.

Otherwise (HevcPrefixBytePresent is equal to 0), all NAL units are decoded using HEVC syntax and the decoding process specified in the SHVC specification.

Alternatively (or additionally) a decoder may perform the following steps when HevcPrefixBytePresent is equal to 0:

If the value of the first byte of any NAL unit is equal to X then the value of HevcPrefixBytePresent is overridden and the entire bitstream (alternatively the remaining bitstream) is decoded with HevcPrefixBytePresent set equal to 1.

Alternatively (or additionally) a decoder may perform the following steps when HevcPrefixBytePresent is equal to 0:

If the value of the first byte of any NAL unit is equal to X then the decoder reports that the bitstream cannot be decoded with HevcPrefixBytePresent set equal to 0.

Alternatively (or additionally) a decoder may perform the following steps when HevcPrefixBytePresent is equal to 0:

If the value of the first byte of any NAL unit is equal to X then the decoder reports that the bitstream contains errors.

Alternatively (or additionally) a decoder may perform the following steps when HevcPrefixBytePresent is equal to 0:

If the value of the first byte of any NAL unit is equal to X then the decoder takes appropriate actions in response to detection of an error in the bitstream; that may include but is not limited to, error concealment methods or removal of certain data from the bitstream.

In one version of the embodiment the specification indicates through a non-normative note that the value of HevcPrefixBytePresent should be set 1 when the stream is a hybrid codec scalability stream e.g.: "NOTE—When avc_base_layer flag is equal to 1 in the VPS that is active for the CVS that is to be decoded, then HevcPrefixBytePresent should be set to 1 by external means.".

Embodiment 4

In one embodiment the syntax table of the SHVC NAL unit is changed as indicated in underline below.

| | Descriptor |
|---|---|
| nal_unit( NumBytesInNalUnit ) { | |
|   if( HevcPrefixBytePresent ==0 \|\|next_bits( 8 )==0x17) { | |
|     if(HevcPrefixBytePresent) | |
|       hevc_prefix_byte | u(8) |
|     nal_unit_header( ) | |
|     NumBytesInRbsp = 0 | |
|     for( i = 2; i < NumBytesInNalUnit; i++ ) | |
|       if( i + 2 < NumBytesInNalUnit && | |
|       next_bits( 24 ) = = 0x000003 ) { | |
|         rbsp_byte[ NumBytesInRbsp++ ] | b(8) |
|         rbsp_byte[ NumBytesInRbsp++ ] | b(8) |
|         i += 2 | |
|         emulation_prevention_three_byte /* equal to 0x03 */ | f(8) |
|       } else | |
|         rbsp_byte[ NumBytesInRbsp++ ] | b(8) |
|   }else | |
|   Rec. ITU-T H.264 \|ISO/IEC 14496-10 nal_unit( NumBytesInNalUnit ) | |
| } | |

The variable name HevcPrefixBytePresent could of course be replaced by any variable name, for example AvcBaseLayer and the syntax table could be replaced by any logically equivalent syntax table, for example as shown below.

| | Descriptor |
|---|---|
| nal_unit( NumBytesInNalUnit ) { | |
|     AvcNalUnit =0 | |
|     if( AvcBaseLayer ) { | |
|         if( next_bits( 8 ) ==0x17) | |
|             hevc_prefix_byte | u(8) |
|         else | |
|             AvcNalUnit =1 | |
|     } | |
|     if( AvcNalUnit ) | |
|         Rec. ITU-T H.264 \|ISO/IEC 14496-10 nal_unit( NumBytesInNalUnit ) | |
|     else { | |
|         nal_unit_header( ) | |
|         NumBytesInRbsp = 0 | |
|         for( i = 2; i < NumBytesInNalUnit; i++ ) | |
|             if( i + 2 < NumBytesInNalUnit && | |
|             next_bits( 24 ) = = 0x000003 ) { | |

-continued

| | Descriptor |
|---|---|
|             rbsp_byte[ NumBytesInRbsp++ ] | b(8) |
|             rbsp_byte[ NumBytesInRbsp++ ] | b(8) |
|             i += 2 | |
|             emulation_prevention_three_byte /* equal to 0x03 */ | f(8) |
|         } else | |
|             rbsp_byte[ NumBytesInRbsp++ ] | b(8) |
|     } | |
| } | |

Embodiment 5

In one embodiment one or more NAL unit type(s) are specified as forbidden values in order to enable detection of the hevc_prefix_byte. Hence the encoder may be configured to indicate one or more NAL unit type(s) as forbidden values.

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture slice_segment_layer_rbsp( ) | VCL |
| 1 | TRAIL_R | | |
| 2 | TSA_N | Coded slice segment of a TSA picture slice_segment_layer_rbsp( ) | VCL |
| 3 | TSA_R | | |
| 4 | STSA_N | Coded slice segment of an STSA picture slice_segment_layer_rbsp( ) | VCL |
| 5 | STSA_R | | |
| 6 | RADL_N | Coded slice segment of a RADL picture slice_segment_layer_rbsp( ) | VCL |
| 7 | RADL_R | | |
| 8 | RASL_N | Coded slice segment of a RASL picture slice_segment_layer_rbsp( ) | VCL |
| 9 | RASL_R | | |
| 10 | RSV_VCL_N10 | Reserved non-IRAP sub-layer non-reference VCL NAL unit types | VCL |
| 12 | RSV_VCL_N12 | | |
| 14 | RSV_VCL_N14 | | |
| 11 | FORBIDDEN11 | Forbidden | N/A |
| ~~11~~ | ~~RSV_VCL_R11~~ | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture slice_segment_layer_rbsp( ) | VCL |
| 17 | BLA_W_RADL | | |
| 18 | BLA_N_LP | | |
| 19 | IDR_W_RADL | Coded slice segment of an IDR picture slice_segment_layer_rbsp( ) | VCL |
| 20 | IDR_N_LP | | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 ... 31 | RSV_VCL24 ... RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 ... 47 | RSV_NVCL41 ... RSV_NVCL47 | Reserved | non-VCL |
| 48 ... 63 | UNSPEC48 ... UNSPEC63 | Unspecified | non-VCL |

It is a requirement of bitstream conformance that the bitstream shall not contain any NAL unit with nal_unit_type equal to FORBIDDEN11. Hence, the reason why the NAL unit is forbidden is so that when a decoder sees the specific prefix byte it will know for sure that it is the prefix byte and not some other NAL unit type that might have been defined after the decoder was created.

A decoder may perform the following steps when the NAL unit type FORBIDDEN11 is detected in any NAL unit of a bitstream:
  HevcPrefixBytePresent is overridden and the entire bitstream (alternatively the remaining bitstream) is decoded with HevcPrefixBytePresent set equal to 1.

A decoder may perform the following steps when the NAL unit type FORBIDDEN11 is detected in any NAL unit of a bitstream:
  The decoder reports that the bitstream cannot be decoded with HevcPrefixBytePresent set equal to 0.

A decoder may perform the following steps when the NAL unit type FORBIDDEN11 is detected in any NAL unit of a bitstream:
  The decoder reports that the bitstream contains errors.

A decoder may perform the following steps when the NAL unit type FORBIDDEN11 is detected in any NAL unit of a bitstream:
  The decoder takes appropriate actions in response to detection of an error in the bitstream, which may include but is not limited to error concealment methods or removal of certain data from the bitstream.

In one version of the embodiment the specification indicates through a non-normative note that when the nal_unit_type FORBIDDEN11 is detected in a bitstream the decoder should request a different value of HevcPrefixBytePresent or override the value the of HevcPrefixBytePresent. e.g.: "NOTE—When HevcPrefixBytePresent is equal to 0 and a NAL unit with nal_unit_type equal to FORBIDDEN11 is detected in a bitstream then the bitstream is a non-conforming bitstream for that mode of operation. However, when this situation occurs, decoders are encouraged to request or emaluate that HevcPrefixBytePresent is set to 1 by external means for such a bitstream as it may make the bitstream conforming.".

Embodiment 6

In one embodiment the syntax table of the SHVC NAL unit is changed as indicated in underline below.

| | Descriptor |
|---|---|
| nal_unit( NumBytesInNalUnit ) { | |
|   if( HevcPrefixBytePresent ==0 ||next_bits( 8 ) == 0x17) { | |
|     if( next_bits( 8 ) ==0x17){ | |
|       hevc_prefix_byte | u(8) |
|       HevcPrefixBytePresent =1 | |
|     } | |
|     nal_unit_header( ) | |
|     NumBytesInRbsp = 0 | |
|     for( i = 2; i < NumBytesInNalUnit; i++ ) | |
|       if( i + 2 < NumBytesInNalUnit && | |
|       next_bits( 24 ) = = 0x000003 ) { | |
|         rbsp_byte[ NumBytesInRbsp++ ] | b(8) |
|         rbsp_byte[ NumBytesInRbsp++ ] | b(8) |
|         i += 2 | |
|         emulation_prevention_three_byte /* equal to 0x03 */ | f(8) |
|       } else | |
|         rbsp_byte[ NumBytesInRbsp++ ] | b(8) |
|   }else | |
|   Rec. ITU-T H.264 |ISO/IEC 14496-10 nal_unit( NumBytesInNalUnit ) | |
| } | |

In one version of the embodiment the initial value of HevcPrefixBytePresent is set by external means but as soon as any NAL unit in which the value of the first byte is equal to X is detected then HevcPrefixBytePresent is set equal to 1.

A decoder may perform the following steps when HevcPrefixBytePresent is set to 0 by external means and a NAL unit that contains the prefix byte is detected:
  HevcPrefixBytePresent is overridden and the entire bitstream (alternatively the remaining bitstream) is decoded with HevcPrefixBytePresent set equal to 1.

Alternatively HevcPrefixBytePresent is not set by external means; instead it is set to 0 when the decoding starts.

A decoder may perform the following steps when HevcPrefixBytePresent is set to 0 by default at the start of decoding and a NAL unit that contains the prefix byte is detected:
  HevcPrefixBytePresent is overridden and the entire bitstream (alternatively the remaining bitstream) is decoded with HevcPrefixBytePresent set equal to 1.

This embodiment is preferably combined with a restriction that requires each bitstream or CVS or access unit to start with an HEVC NAL unit that contains the prefix byte when the stream is a hybrid codec scalability stream.

In an alternative realization that could be combined with any of the embodiments above, an additional syntax element is added in front of all AVC NAL units as well. This additional syntax element could serve as an identification element when the bitstream is processed in an HEVC context and the NAL unit would then easily be identified as an AVC NAL unit. When processed in an AVC context the additional syntax element would be interpreted as a separate unknown (undefined) NAL unit that would be discarded by legacy AVC decoders. This scheme is further elaborated in embodiment 7.

Embodiment 7

In one embodiment an additional syntax element, hereafter referred to as "the AVC prefix byte", is added to all AVC NAL units as mentioned in the general section above. The value of the AVC prefix byte, hereafter referred to as "Z", is preferably selected such that it corresponds to values of nal_unit_type that is defined to be reserved for future use in both AVC and HEVC. An example of such a value is 22 (0x16).

An SHVC decoder that supports the hybrid codec scalability profile may use the embodiment according to the following ordered steps to decode a bitstream that conforms to the hybrid codec scalability profile:
  1. The first byte of each NAL unit is examined:
    If the value of the first byte is equal to Z then the NAL unit (without the AVC prefix byte) is decoded using the decoding process defined in the AVC specification and, when the decoding process results in a decoded picture, that decoded picture might be further processed as defined in the SHVC specification.

Otherwise, if the value of the first byte of the NAL unit is equal to X, the NAL unit is decoded using the decoding process specified for the hybrid codec scalability profile in the SHVC specification.

Otherwise, (the value of the first byte of the NAL unit is not equal to Z and not equal to X), the NAL unit is decoded using the decoding process specified for the "normal" SHVC, i.e. non-hybrid-codec-scalability, profile in the SHVC specification.

Alternatively, external means are available to indicate if the stream is a hybrid codec scalability stream or not (through the variable AvcBaseLayer).

An SHVC decoder that supports the hybrid codec scalability profile may use the embodiment according to the following ordered steps to decode a bitstream that conforms to the hybrid codec scalability profile when AvcBaseLayer is equal to 1:

1. The first byte of each NAL unit is examined:
   If the value of the first byte is equal to Z then the NAL unit (without the AVC prefix byte) is decoded using the decoding process defined in the AVC specification and, when the decoding process results in a decoded picture, that decoded picture might be further processed as defined in the SHVC specification.

Otherwise, if the value of the first byte of the NAL unit is equal to X, the NAL unit is decoded using the decoding process specified for the hybrid codec scalability profile in the SHVC specification.

Otherwise, (the value of the first byte of the NAL unit is not equal to Z and not equal to X), the decoder concludes that the bitstream is not a compliant bitstream according to the current mode of operation and can interpret that as a bit-error, loss of data, non-compliant bitstream (encoder) or faulty setting of the variable AvcBaseLayer. It may report the error, perform error concealment or take other appropriate actions such as override the value of AvcBaseLayer.

An SHVC decoder may use the embodiment according to the following ordered steps to decode a bitstream when AvcBaseLayer is equal to 0:

1. The first byte of each NAL unit is examined:
   If the value of the first byte is equal to Z or X the decoder concludes that the bitstream is not a compliant bitstream according to the current mode of operation and can interpret that as a bit-error, loss of data, non-compliant bitstream (encoder) or faulty setting of the variable AvcBaseLayer. It may report the error, perform error concealment or take other appropriate actions such as override the value of AvcBaseLayer.

Otherwise, (the value of the first byte of the NAL unit is not equal to Z and not equal to X), the NAL unit is decoded using the decoding process specified in the SHVC specification.

An SHVC encoder that supports the hybrid codec scalability profile may use the embodiment according to the following ordered steps to encode a bitstream that conforms to the hybrid codec scalability profile:

1. The input video is encoded as a scalable video stream in which:
   Pictures and data that belong to the lowest layer are encoded using the encoding process defined in the AVC specification with the addition of the AVC prefix byte in front of each AVC NAL unit header, or more correctly encoded using the syntax and semantics defined in the AVC specification with the addition of the AVC prefix byte.

Pictures and data that belong to higher layers are encoded using the encoding process specified in the SHVC specification with the addition of the prefix byte in front of each HEVC NAL unit header, or more correctly encoded according to the syntax and semantics defined in the SHVC specification with the addition of the prefix byte.

Embodiment 8

In one embodiment the prefix byte is added for all HEVC NAL units in all SHVC profiles (not only the hybrid codec scalability profile(s)).

An SHVC encoder may use the embodiment according to the following ordered steps to encode a bitstream:

1. The input video is encoded as a scalable video stream in which:
   If the stream that is encoded is a hybrid codec scalability stream and the NAL unit that is being encoded belongs to the lowest layer it is encoded using the encoding process defined in the AVC specification, or more correctly encoded using the syntax and semantics defined in the AVC specification.

Otherwise (the stream that is encoded is not a hybrid codec scalability stream or the NAL unit that is being encoded does not belong to the lowest layer), the NAL unit is encoded using the encoding process specified in the SHVC specification with the addition of the prefix byte in front of each HEVC NAL unit header, or more correctly encoded according to the syntax and semantics defined in the SHVC specification with the addition of the prefix byte.

An aspect of the embodiments relates to an encapsulation device. The encapsulation device is configured to determine that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The encapsulation device is also configured to add a prefix syntax element to each second encapsulation unit. The prefix syntax element has a value selected among a defined set of at least one value corresponding to at least one encapsulation unit type value that will trigger a decoder conforming to the first video coding standard to discard or ignore the second encapsulation units.

In an embodiment, the encapsulation device is configured to add, to each second encapsulation unit, the prefix syntax element having a value selected among the defined set corresponding to at least one encapsulation unit type value that is defined as reserved for future use or unspecified according to the first video coding standard.

In an embodiment, the encapsulation device is configured to add, to each second encapsulation unit, the prefix syntax element having a value selected among the defined set corresponding to at least one encapsulation unit type value that is defined as reserved for future use or unspecified according to the first video coding standard and according to the second video coding standard.

In an embodiment, the encapsulation device is configured to determine that the bitstream comprises AVC NAL units comprising video data representing the base layer and encoded according to the AVC video coding standard and HEVC NAL units comprising video data representing the at least one enhancement layer and encoded according to the HEVC video coding standard. Each AVC NAL unit comprises an AVC NAL unit header, with a NAL unit type value, and a payload portion and each HEVC NAL unit comprises an HEVC NAL unit header, with a NAL unit type value, and a payload portion. The encapsulation device is also configured to add, to each HEVC NAL unit, a prefix byte having a value selected among the defined set corresponding to at least one NAL unit type value that will trigger an AVC-conforming decoder to discard or ignore the HEVC NAL units.

In an embodiment, the encapsulation device is configured to add, to each HEVC NAL unit, the prefix byte having a value selected among the defined set consisting of 22 and 23.

In an embodiment, the encapsulation device is configured to determine that the bitstream comprises first RTP packets comprising video data representing the base layer and encoded according to the first video coding standard and second RTP packets comprising video data representing at least one enhancement layer and encoded according to the second, different video coding standard. Each first RTP packet comprises an RTP header and a first encapsulation unit and each second RTP packet comprises an RTP header and a second encapsulation unit. The encapsulation device is also configured to add, to each second RTP packet, the prefix syntax element in between the RTP header and the second encapsulation unit.

In an embodiment, the encapsulation device is configured to set a variable in a SDP message to a value indicating that the bitstream is a hybrid codec scalable video bitstream. The encapsulation device is also configured to transmit the SDP message to a receiving RTP client.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Figure 19:
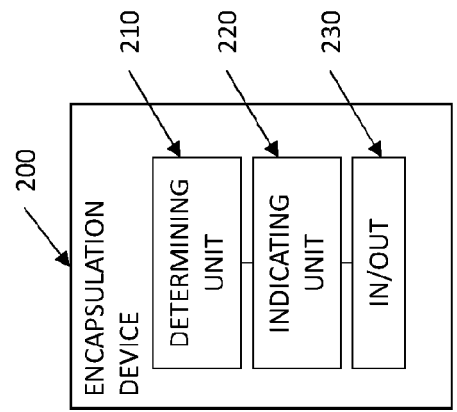
FIG. 19 is a schematic block diagram of an encapsulation device according to another embodiment.

FIG. 19 illustrates a particular hardware implementation of the encapsulation device 200. The encapsulation device 200 comprises a determining unit 210 configured to determine that the bitstream comprises the first encapsulation units and the second encapsulation units. The encapsulation device 200 also comprises an indicating unit 220 configured to add the prefix syntax element to the second encapsulation units. The encapsulation device 200 further comprises an input and output unit (in/out) 230 configured to output the bitstream comprising the first encapsulation units and the second encapsulation units.

The determining unit 210 is connected to the indicating unit 220 to instruct the indicating unit 220 that the present bitstream comprises both first and second encapsulation units and that the indicating unit 220 should add the prefix syntax element to the second encapsulation units. The input and output unit 230 is connected to the indicating unit 220 to receive with encapsulation units therefrom following addition of the prefix syntax elements.

The input and output unit 230 could be implemented to have both transmitter and receiver functionality, such as in the form of a transceiver or a transmitter and receiver pair adapted for wireless transmission and reception of data. In an alternative approach, the input and output unit 230 could be in the form of an input and output (I/O) unit configured for wired communication of data.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 18:
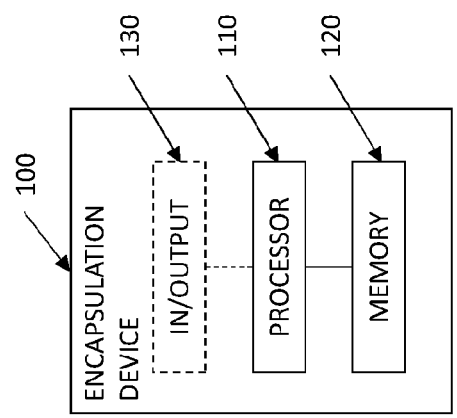
FIG. 18 is a schematic block diagram of an encapsulation device according to an embodiment.

In a particular example, the encapsulation device 100 comprises a processor 110 and a memory 120 as shown in FIG. 18. The memory 120 comprises instructions executable by the processor 110. The processor 110 is operative to determine that the bitstream comprises the first encapsulation units and the second encapsulation units. The processor is also operative to add the prefix syntax elements to the second encapsulation units.

In a particular embodiment, the processor 110 is operative, when executing the instructions stored in the memory 120, to determine that the bitstream comprises the first encapsulation units and the second encapsulation units and to add the prefix syntax elements to the second encapsulation units.

The processor 110 and memory 120 are interconnected to each other to enable normal software execution.

The encapsulation device 100 may optionally comprise an input and output unit 130 configured to output the bitstream comprising the first encapsulation units and the second encapsulation units. The input and output unit 130 is preferably also configured to receive the unmodified encapsulation units or indeed receive uncoded video data of the hybrid codec scalable video.

The input and output unit 130 could be implemented to have both transmitter and receiver functionality, such as in the form of a transceiver or a transmitter and receiver pair adapted for wireless transmission and reception of data. In an alternative approach, the input and output unit 130 could be in the form of an input and output (I/O) unit configured for wired communication of data.

Figure 25:
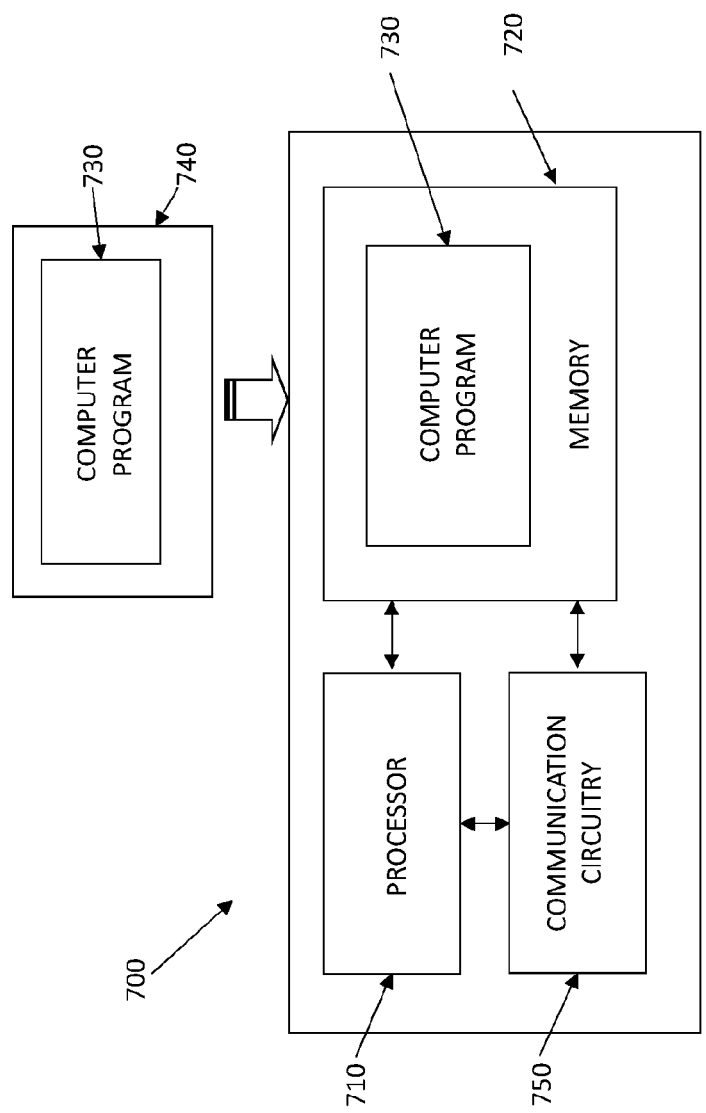
FIG. 25 schematically illustrates an implementation of the embodiments in the form of a computer program with a carrier for the computer program.

FIG. 25 is a schematic block diagram illustrating an example of a user equipment 700 comprising a processor 710, an associated memory 720 and a communication circuitry 750.

In this particular example, at least some of the steps, functions, procedures, modules and/or blocks described herein are implemented in a computer program 730, which is loaded into the memory 720 for execution by processing circuitry including one or more processors 710. The processor 710 and memory 720 are interconnected to each other to enable normal software execution. A communication circuitry 750 is also interconnected to the processor 710 and/or the memory 720 to enable input and/or output of hybrid codec scalable video data and a hybrid codec scalable video bitstream.

The user equipment 700 can be any device or apparatus that can encapsulate encoded video data of a bitstream. For instance, the user equipment 700 could be a computer, either stationary or portable, such as laptop, a smart phone, a tablet, a set-top box, a video camera, a mobile device, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In a particular embodiment, the computer program 730 comprises instructions, which when executed by the processor 710, cause the processor 710 to determine that a bitstream comprises first encapsulation units comprising video data representing a base layer of a hybrid codec scalable video and encoded according to a first video coding standard and a second encapsulation unit comprising video data representing at least one enhancement layer of the hybrid codec scalable video and encoded according to a second, different video coding standard. The processor 710 is also caused to add a prefix syntax element to each second encapsulation unit. The prefix syntax element has a value selected among a defined set of at least one value corresponding to at least one encapsulation type value that will trigger a decoder conforming to the first video coding standard to discard or ignore the 10 second encapsulation unit.

The proposed technology also provides a carrier 740 comprising the computer program 730. The carrier 740 is one of an electronic signal, an optical signal, an electromagnetic signal, a magnetic signal, an electric signal, a radio signal, a microwave signal, or a computer-readable storage medium 740.

By way of example, the software or computer program 730 may be realized as a computer program product, which is normally carried or stored on a computer-readable medium 740, preferably non-volatile computer-readable storage medium 740. The computer-readable medium 740 may include one or more removable or non-removable memory devices including, but not limited to a Read-Only Memory (ROM), a Random Access Memory (RAM), a Compact Disc (CD), a Digital Versatile Disc (DVD), a Blueray disc, a Universal Serial Bus (USB) memory, a Hard Disk Drive (HDD) storage device, a flash memory, a magnetic tape, or any other conventional memory device. The computer program 730 may thus be loaded into the operating memory of a computer or equivalent processing device, represented by the user equipment 700 in FIG. 25, for execution by the processor 710 thereof.

The flow diagram or diagrams presented herein may therefore be regarded as a computer flow diagram or diagrams, when performed by one or more processors. A corresponding encapsulation device may be defined as a group of function modules, where each step performed by the processor corresponds to a function module. In this case, the function modules are implemented as a computer program running on the processor. Hence, the encapsulation device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 19.

FIG. 19 is a schematic block diagram of an encapsulation 300 with function modules. The encapsulation device 300 comprises a determining module 310 for determining that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The encapsulation device 300 also comprises an adding module 320 for adding a prefix syntax element to each second encapsulation unit. The prefix syntax element has a value selected among a defined set of at least one value corresponding to at least one encapsulation unit type that will trigger a decoder conforming to the first video coding standard to discard or ignore the second encapsulation unit.

In an embodiment, an encoder for encoding a video sequence represented by a bitstream is provided. The encoder comprises an in/output unit for receiving the bitstream to be encoded and for transmitting the encoded bitstream. It further comprises a determining unit for determining that AVC NAL units and HEVC NAL units have to coexist in the same bitstream and an indication unit for indicating in a NAL header that an HEVC NAL unit exists. The indication may be performed according to one of embodiments described herein or a combination thereof.

The encoder may be implemented by a computer comprising a processor and a memory. The memory contains instructions executable by the processor whereby said encoder is operative to perform the method described herein.

The encapsulation device of the various embodiments may be implemented as a computer, either stationary or portable, such as laptop, a smart phone, a tablet, a set-top box, etc., or as a part of a computer, either stationary or portable, such as laptop, a smart phone, a tablet, a set-top box, etc. The encapsulation device may be implemented as a component of an encoder or as a transmission control device configured to form data packets suitable for transmission over a communication network.

Another aspect of the embodiments relates to a video decoder. The video decoder is configured to examine a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The video decoder is also configured to decode an encapsulation unit according to the first video coding standard if the first portion of the encapsulation unit has a value not equal to any value belonging to a defined set of at least one value. The video decoder is further configured to remove the first portion from an encapsulation unit and decode a remaining portion of the encapsulation unit according to the second, different video coding standard if the first portion of the encapsulation unit has a value equal to a value belonging to the defined set.

In an embodiment, the video decoder is configured to examine a first byte of each NAL unit in the bitstream comprising AVC NAL units comprising video data representing the base layer and encoded according to the AVC video coding standard and HEVC NAL units comprising video data representing the at least one enhancement layer and encoded according to the HEVC video coding standard. The video decoder is also configured to decode a NAL unit according to the AVC video decoding standard if the first byte of the NAL unit has a value not equal to any value belonging to the defined set. The video decoder is further configured to remove the first byte from a NAL unit and decode a remaining portion of the NAL unit according to the HEVC video coding standard if the first byte of the NAL unit has a value equal to a value belonging to the defined set.

In an embodiment, the video decoder is configured to decode a NAL unit according to the AVC video coding standard if the first byte of the NAL unit has a value not equal to 22 or 23. The video decoder is also configured to remove the first byte from a NAL unit and decode the remaining portion of the NAL unit according to the HEVC video decoding standard if the first byte of the NAL unit has a value equal 25 to 22 or 23.

In an embodiment, the video decoder is configured to set a variable in or associated with the bitstream to a value based on input information. The video decoder is also configured to perform decoding the NAL unit and removing the first portion if the variable has a value indicating that the bitstream is a hybrid codec scalable video bitstream. The video decoder is further configured to decode all NAL units according to the HEVC video coding standard if the variable does not have the value indicating that the bitstream is a hybrid codec scalable video bitstream.

In an embodiment, the video decoder is configured to set, if the variable is equal to 0, the variable to 1 if a first portion of a NAL unit has a value equal to a value belonging to the defined set.

In an embodiment, the video decoder is configured to set a variable in or associated with the bitstream to a value based on input information. The video decoder is also configured to generate, if the variable is equal to 0, a report that the bitstream cannot be decoded if a first portion of a NAL unit has a value equal to a value belonging to the defined set.

In an embodiment, the video decoder is configured to set a variable in or associated with the bitstream to a value based on input information. The video decoder is also configured to generate, if the variable is equal to 0, a report that the bitstream contains errors if a first portion of a NAL unit has a value equal to a value belonging to the defined set.

In an embodiment, the video decoder is configured to set a variable in or associated with the bitstream to a value based on input information. The video decoder is also configured to trigger, if the variable is equal to 0, an error concealment if a first portion of a NAL unit has a value equal to a value belonging to the defined set.

Figure 22:
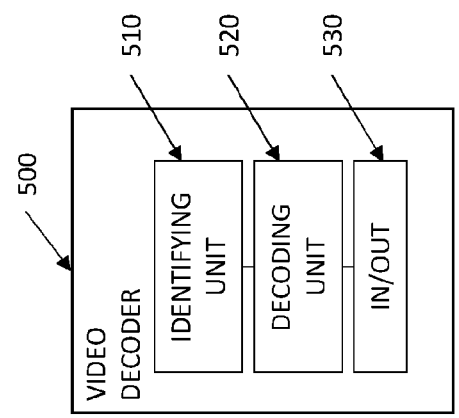
FIG. 22 is a schematic block diagram of a video decoder according to another embodiment.

FIG. 22 illustrates a particular hardware implementation of the video decoder 500. The video decoder 500 comprises an identifying unit 510 configured to examine the first portion of each NAL unit as described herein. The video decoder 500 further comprises a decoding unit 520 configured to decode the encapsulation unit and remove the first portion and decode the remaining portion as described herein.

In an embodiment, the video decoder 500 further comprises an input and output unit 530 configured to receive the bitstream and ouput decoded video data.

The identifying unit 510 is connected to the decoding unit 520 to instruct the decoding unit 520 how to decode an encapsulation unit based on the examined first portion of the encapsulation unit. The input and output unit 530 is connected to the identifying unit 510 to forward the received encapsulation units of the bitstream to the identifying unit. The input and output unit 530 is preferably also connected to the decoding unit 520 to receive the decoded video data therefrom for further output, such as output for display on a screen.

The input and output unit 530 could be implemented to have both transmitter and receiver functionality, such as in the form of a transceiver or a transmitter and receiver pair adapted for wireless transmission and reception of data. In an alternative approach, the input and output unit 530 could be in the form of an input and output (I/O) unit configured for wired communication of data.

Figure 21:
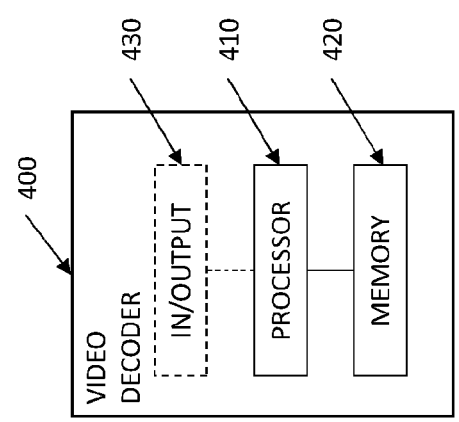
FIG. 21 is a schematic block diagram of a video decoder according to an embodiment.

In a particular example, the video decoder 400 comprises a processor 410 and a memory 420 as shown in FIG. 21. The memory 420 comprises instructions executable by the processor 410. The processor 410 is operative to examiner the first portion of each NAL unit as described herein. The processor 410 is also operative to decode the encapsulation unit and remove the first portion and decode the remaining portion as described herein.

In a particular embodiment, the processor 410 is operative, when executing the instructions stored in the memory 420, to perform the above mentioned operations.

The processor 410 and memory 420 are interconnected to each other to enable normal software execution.

The video decoder 400 may optionally comprise an input and output unit 430. The operation and implementation of this input and output unit 430 is preferably the same as previously described herein in connection to FIG. 22.

In a particular embodiment, the computer program 730 shown in FIG. 25 comprises instructions, which when executed by the processor 710, cause the processor 710 to examine a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The processor 710 is also caused to decode an encapsulation unit according to the first video coding standard if the first portion of the encapsulation unit has a value not equal to any value belonging to a defined set of at least one value. The processor 710 is further caused to remove the first portion from an encapsulation unit and decode a remaining portion of the encapsulation unit according to the second, different video coding standard if the first portion of the encapsulation unit has a value equal to a value belonging to said defined set.

Figure 23:
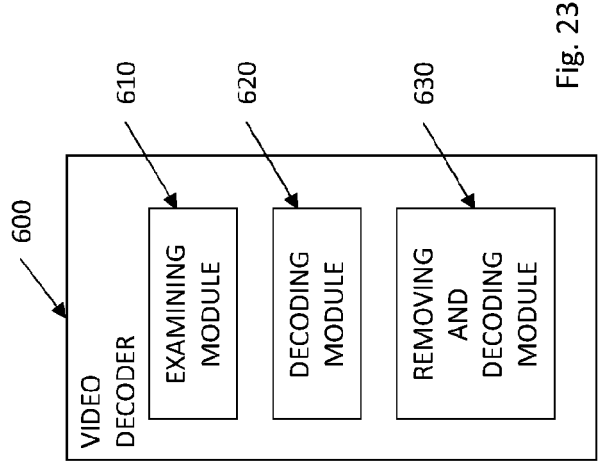
FIG. 23 is a schematic block diagram of a video decoder according to a further embodiment.

FIG. 23 is a schematic block diagram of a video decoder 600 with function modules. The video decoder 600 comprises an examining module 610 for examining a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard. The video decoder 600 also comprises a decoding module 620 for decoding an encapsulation unit according to the first video coding standard if the first portion of the encapsulation unit has a value not equal to any value belonging to a defined set of at least one value. The video decoder 600 further comprises a removing and decoding module 630 for removing the first portion from an encapsulation unit and decoding a remaining portion of the encapsulation unit according to the second, different video coding standard if the first portion of the encapsulation unit has a value equal to a value belonging to said defined set.

In an embodiment, a decoder for decoding a video sequence represented by a bitstream is provided. The decoder comprises an in/output unit for receiving the encoded bitstream and for outputting the decoded bitstream for e.g. displaying. It further comprises a decoding unit for decoding the NAL header and an identifying unit for identifying an indication in the NAL header that an HEVC NAL unit exists. The indication can be according to one of embodiments described herein or a combination thereof. When a HEVC NAL unit is identified it is decoded according to HEVC.

The decoder may be implemented by a computer comprising a processor and a memory. The memory contains instructions executable by said processor whereby said decoder is operative to perform the method described herein.

The video decoder of the various embodiments may be implemented as a computer, either stationary or portable, such as laptop, a smart phone, a tablet, a set-top box, etc., or as a part of a computer, either stationary or portable, such as laptop, a smart phone, a tablet, a set-top box, etc.

Figure 24:
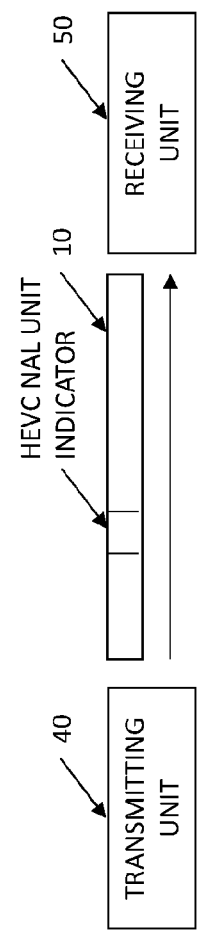
FIG. 24 schematically illustrates a transmitting unit and a receiving unit according to an embodiment.

The encapsulation device can be implemented in a transmitting unit 40, e.g. a video camera or a mobile device, and the video decoder can be implemented in a receiving unit 50, e.g. a video camera with a display or a mobile device, as shown in FIG. 24.

Figure 20:
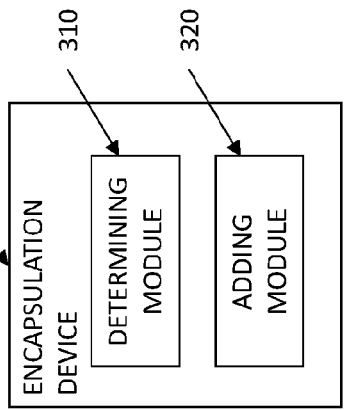
FIG. 20 is a schematic block diagram of an encapsulation device according to a further embodiment.

Thus, an embodiment relates to a transmitting unit 40 comprising an encapsulation device according to any of the embodiments, such as disclosed in FIGS. 18-20.

Another embodiment relates to a receiving unit 50 comprising a video decoder according to any of the embodiments, such as disclosed in FIGS. 21-23.

In an embodiment, the receiving unit 50 is configured to receive an SDP message from a transmitting RTP client 40. The receiving unit 50 is also configured to examine a variable in the SDP message and determine that the bitstream 10 is a hybrid codec scalable video bitstream based on the variable.

An advantage with embodiments is that they enable carriage of AVC NAL units and HEVC NAL units in the same stream in a way that is backwards compatible with legacy AVC decoders and extractors.

The embodiments apply to a decoder, an encoder and an element that operates on a bitstream, such as a network-node or a Media Aware Network Element.

The embodiments are not limited to SHVC, AVC or HEVC but may be applied to other combinations of codecs for hybrid codec scalability.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] ITU-T H.264 Telecommunication Standardization Sector of ITU, Series H: Audiovisual and multimedia systems, Infrastructure of audiovisual services—Coding of moving video, Advanced video coding for generic audiovisual|ISO/IEC 14496-10 Information technology—Coding of audio-visual objects—Part 10: Advanced Video Coding

[2] ITU-T H.265 Telecommunication Standardization Sector of ITU, Series H: Audiovisual and multimedia systems, Infrastructure of audiovisual services—Coding of moving video, High efficiency video coding|ISO/IEC 23008-2 Information technology—High efficiency coding and media delivery in heterogeneous environments—Part 2: High efficiency video coding

[3] Boyce, Specification text to support AVC base layer in HEVC layered extensions, JCT-VC of ITU-T SG 16 WP 3 and ISO/IEC JTC 1/SC 29/WG 11, 14$^{th}$ Meeting: Vienna, AT, 27 Jul.-2 Aug. 2013, Document: JCTVC-N0050; Joint Collaborative Team on 3D Video Coding Extensions of ITU-T SG 16 WP 3 and ISO/IEC JTC 1/SC 29/WG 11, 5$^{th}$ Meeting: Vienna, AT, 27 Jul.-2 Aug. 2013, Document: JCT3V-E0037

[4] Boyce, Joint Collaborative Team on Video Coding (JCT-VC) of ITU-T SG 16 WP 3 and ISO/IEC JTC 1/SC 29/WG 11, 18thm Meeting: Sapporo, JP, 30 Jun.-9 Jul. 2014, Document JCTVC-R1014

The invention claimed is:

1. An encapsulation method comprising:
   determining that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard; and
   adding a prefix syntax element to each second encapsulation unit, the prefix syntax element having a value selected among a defined set of at least one value that will trigger a decoder conforming to the first video coding standard to discard or ignore the second encapsulation units,
   wherein:
   each first encapsulation unit comprises a first encapsulation unit header, with an encapsulation unit type value, and a payload portion and each second encapsulation unit comprises a second encapsulation unit header, with an encapsulation unit type value, and a payload portion; and
   the defined set of at least one value correspond to at least one encapsulation unit type value that will trigger the decoder conforming to the first video coding standard to discard or ignore the second encapsulation units, and
   adding the prefix syntax element comprises adding, to each second encapsulation unit, the prefix syntax element having a value selected among the defined set corresponding to at least one encapsulation unit type value that is defined as reserved for future use or unspecified according to the first video coding specification/format/standard and according to the second video coding specification/format/standard.

2. A video decoding method comprising:
   examining a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard;

decoding an encapsulation unit according to the first video coding standard if the first portion of the encapsulation unit has a value not equal to any value belonging to a defined set of at least one value;

removing the first portion from an encapsulation unit and decoding a remaining portion of the encapsulation unit according to the second, different video coding standard if the first portion of the encapsulation unit has a value equal to a value belonging to the defined set, wherein, examining the first portion comprises examining a first byte of each Network Abstraction Layer, NAL, unit in the bitstream comprising Advanced Video Coding, AVC, NAL units comprising video data representing the base layer and encoded according to the AVC video coding standard and High Efficiency Video Coding, HEVC, NAL units comprising video data representing the at least one enhancement layer and encoded according to the HEVC video coding standard, wherein decoding the encapsulation unit comprises decoding a NAL unit according to the AVC video coding standard if the first byte of the NAL unit has a value not equal to any value belonging to the defined set, wherein removing the first portion comprises removing the first byte from a NAL unit and decoding a remaining portion of the NAL unit according to the HEVC video coding standard if the first byte of the NAL unit has a value equal to a value belonging to the defined set;

setting a variable in or associated with the bitstream to a value based on input information;

performing, if the variable has a value indicating that the bitstream is a hybrid codec scalable video bitstream, decoding the NAL unit according to the AVC video coding standard if the first byte of the NAL unit has a value not equal to any value belonging to the defined set and removing the first byte from the NAL unit and decoding the remaining portion of the NAL unit according to the HEVC video coding standard if the first byte of the NAL unit has a value equal to a value belonging to the defined set; and decoding all NAL units according to the HEVC video coding standard if the variable does not have the value indicating that the bitstream is a hybrid codec scalable video bitstream.

3. An encapsulation device comprising:

a processor; and a memory coupled to the processor, the memory comprising instructions stored therein that are executable by the processor for causing the processor to:

determine that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard; and add a prefix syntax element to each second encapsulation unit, the prefix syntax element having a value selected among a defined set of at least one value that will trigger a decoder conforming to the first video coding standard to discard or ignore the second encapsulation units, wherein each first encapsulation unit comprises a first encapsulation unit header, with an encapsulation unit type value, and a payload portion and each second encapsulation unit comprises a second encapsulation unit header, with an encapsulation unit type value, and a payload portion; the defined set of at least one value correspond to at least one encapsulation unit type value that will trigger the decoder conforming to the first video coding standard to discard or ignore the second encapsulation units; and add, to each second encapsulation unit, the prefix syntax element having a value selected among the defined set corresponding to at least one encapsulation unit type value that is defined as reserved for future use or unspecified according to the first video coding specification/format/standard and according to the second video coding specification/format/standard.

4. The encapsulation device according to claim 3, wherein the memory comprises further instructions stored therein that are executable by the processor for causing the processor to:

determine that the bitstream comprises Advanced Video Coding, AVC, Network Abstraction Layer, NAL, comprising video data representing the base layer and encoded according to the AVC video coding standard and High Efficiency Video Coding, HEVC, NAL units comprising video data representing the at least one enhancement layer and encoded according to the HEVC video coding standard, each AVC NAL unit comprises an AVC NAL unit header, NUH, with a NAL unit type value, and a payload portion and each HEVC NAL unit comprises a HEVC NUH, with a NAL unit type value, and a payload portion; and add, to each HEVC NAL unit, a prefix byte having a value selected among the defined set corresponding to at least one NAL unit type value that will trigger an AVC-conforming decoder to discard or ignore the HEVC NAL units.

5. The encapsulation device according to claim 4, wherein the memory comprises further instructions stored therein that are executable by the processor for causing the processor to:

determine that the bitstream comprises first Real-time Transport Protocol, RTP, packets comprising video data representing the base layer and encoded according to the first video coding standard and second RTP packets comprising video data representing at least one enhancement layer and encoded according to the second, different video coding standard, each first RTP packets comprises an RTP header and a first encapsulation unit and each second RTP packet comprises an RTP header and a second encapsulation unit; and add, to each second RTP packet, the prefix syntax element in between the RTP header and the second encapsulation unit.

6. The encapsulation device according to claim 5, wherein the memory comprises further instructions stored therein that are executable by the processor for causing the processor to:

set a variable in a Session Description Protocol, SDP, message to a value indicating that the bitstream is a hybrid codec scalable video bitstream;

transmit the SDP message to a receiving RTP client.

7. The encapsulation device according to claim 3, further comprising:

a transceiver coupled to the processor, wherein the instructions that are executable for causing the processor to output the bitstream comprising the first encapsulation units and the second encapsulation units further causes the processor to control the transceiver to cause the transceiver to output the bitstream.

8. A transmitting unit comprising an encapsulation device according to claim 3.

9. A video decoder comprising:
a processor; and
a memory coupled to the processor, the memory comprising instructions stored therein that are executable by the processor for causing the processor to:
examine a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard;
decode an encapsulation unit according to the first video coding standard if the first portion of the encapsulation unit has a value not equal to any value belonging a defined set of at least one value;
remove the first portion from an encapsulation unit and decode a remaining portion of the encapsulation unit according to the second, different video coding standard if the first portion of the encapsulation unit has a value equal to a value belonging to the defined set;
examine a first byte of each Network Abstraction Layer, NAL, unit in the bitstream comprising Advanced Video Coding, AVC, NAL units comprising video data representing the base layer and encoded according to the AVC video coding standard and High Efficiency Video Coding, HEVC, NAL units comprising video data representing the at least one enhancement layer and encoded according to the HEVC video coding standard;
decode a NAL unit according to the AVC video coding standard if the first byte of the NAL unit has a value not equal to any value belonging to the defined set;
remove the first byte from a NAL unit and decode a remaining portion of the NAL unit according to the HEVC video coding standard if the first byte of the NAL unit has a value equal to a value belonging to the defined set, and wherein
set a variable in or associated with the bitstream to a value based on input information;
perform, if the variable has a value indicating that the bitstream is a hybrid codec scalable video bitstream, decoding the NAL unit according to the AVC video coding standard if the first byte of the NAL unit has a value not equal to any value belonging to the defined set and removing the first portion from the NAL unit and decode the remaining portion of the NAL unit according to the HEVC video coding standard if the first byte of the NAL unit has a value equal to a value belonging to the defined set; and
decode all NAL units according to the HEVC video coding standard if the variable does not have the value indicating that the bitstream is a hybrid codec scalable video bitstream.

10. The video decoder according to claim 9, wherein the memory comprises further instructions stored therein that are executable by the processor for causing the processor to set, if the variable is equal to 0, the variable to 1 if a first portion of a NAL unit has a value equal to a value belonging to the defined set.

11. The video decoder according to claim 10, wherein the memory comprises further instructions stored therein that are executable by the processor for causing the processor to:
set a variable in or associated with the bitstream to a value based on input information; and
generate, if the variable is equal to 0, a report that the bitstream contains errors if a first portion of a NAL unit has a value equal to a value belonging to the defined set.

12. A receiving unit comprising a video decoder according to claim 9.

13. The receiving unit according to claim 12, wherein the memory comprises further instructions executable by the processor for causing the processor to:
receive a Session Description Protocol, SDP, message from a transmitting RTP client;
examine a variable in the SDP message; and
determine that the bitstream is a hybrid codec scalable video bitstream based on the variable.

14. A computer program comprising a non-transitory computer readable storage medium storing instructions, which when executed by a processor, cause the processor to:
determine that a bitstream comprises first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard; and
add a prefix syntax element to each second encapsulation unit, the prefix syntax element having a value selected among a defined set of at least one value that will trigger a decoder conforming to the first video coding standard to discard or ignore the second encapsulation units, wherein each first encapsulation unit comprises a first encapsulation unit header, with an encapsulation unit type value, and a payload portion and each second encapsulation unit comprises a second encapsulation unit header, with an encapsulation unit type value, and a payload portion; and
the defined set of at least one value correspond to at least one encapsulation unit type value that will trigger the decoder conforming to the first video coding standard to discard or ignore the second encapsulation units, and wherein adding the prefix syntax element comprises adding, to each second encapsulation unit, the prefix syntax element having a value selected among the defined set corresponding to at least one encapsulation unit type value that is defined as reserved for future use or unspecified according to the first video coding specification/format/standard and according to the second video coding specification/format/standard.

15. A computer program product comprising a non-transitory computer readable storage medium storing instructions, which when executed by a processor, cause the processor to:
examine a first portion of each encapsulation unit in a bitstream comprising first encapsulation units comprising video data representing a base layer of a hybrid codec scalable video and encoded according to a first video coding standard and second encapsulation units comprising video data representing at least one enhancement layer of the hybrid codec scalable video and encoded according to a second, different video coding standard;
decode an encapsulation unit according to the first video coding standard if the first portion of the encapsulation unit has a value not equal to any value belonging to a defined set of at least one value; and remove the first portion from an encapsulation unit and decode a remaining portion of the encapsulation unit according to the second, different video coding standard if the first portion of the encapsulation unit has a value equal to a value belonging to the defined set, wherein examining the first portion comprises examining a first byte of each Network Abstraction Layer, NAL, unit in the bitstream comprising Advanced Video Coding, AVC, NAL units comprising video data representing the base layer and encoded according to the AVC video coding standard and High Efficiency Video Coding, HEVC, NAL units comprising video data representing the at least one enhancement layer and encoded according to the HEVC video coding standard;

decoding the encapsulation unit comprises decoding a NAL unit according to the AVC video coding standard if the first byte of the NAL unit has a value not equal to any value belonging to the defined set;

removing the first portion comprises removing the first byte from a NAL unit and decoding a remaining portion of the NAL unit according to the HEVC video coding standard if the first byte of the NAL unit has a value equal to a value belonging to the defined set;

setting a variable in or associated with the bitstream to a value based on input information;

performing, if the variable has a value indicating that the bitstream is a hybrid codec scalable video bitstream, decoding the NAL unit according to the AVC video coding standard if the first byte of the NAL unit has a value not equal to any value belonging to the defined set and removing the first byte from the NAL unit and decoding the remaining portion of the NAL unit according to the HEVC video coding standard if the first byte of said NAL unit has a value equal to a value belonging to the defined set; and decoding all NAL units according to the HEVC video coding standard if the variable does not have the value indicating that the bitstream is a hybrid codec scalable video bitstream.

* * * * *